United States Patent

Knutsson

(10) Patent No.: US 9,561,437 B2
(45) Date of Patent: Feb. 7, 2017

(54) METHOD FOR IMPLEMENTING A COMPUTER GAME

(71) Applicant: King.com Limited, St. Julians (MT)

(72) Inventor: Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 483 days.

(21) Appl. No.: 14/029,289

(22) Filed: Sep. 17, 2013

(65) Prior Publication Data

US 2014/0128159 A1    May 8, 2014

Related U.S. Application Data

(60) Provisional application No. 61/701,907, filed on Sep. 17, 2012, provisional application No. 61/811,019, (Continued)

(30) Foreign Application Priority Data

Feb. 6, 2013 (GB) .................................. 1302121.7
Feb. 19, 2013 (GB) .................................. 1302910.3
(Continued)

(51) Int. Cl.
  *A63F 13/00* (2014.01)
  *A63F 13/25* (2014.01)
  (Continued)

(52) U.S. Cl.
  CPC ............... *A63F 13/25* (2014.09); *A63B 71/06* (2013.01); *A63F 13/00* (2013.01); *A63F 13/005* (2013.01);
  (Continued)

(58) Field of Classification Search
  CPC .......... A63F 13/20; A63F 13/52; A63F 13/55; A63F 13/80; A63F 13/822
  (Continued)

(56) References Cited

U.S. PATENT DOCUMENTS 5,488,496 A    1/1996  Pine
6,068,552 A    5/2000  Walker et al.
(Continued)

FOREIGN PATENT DOCUMENTS

DE    10304725 A1    9/2004
EP    1564698 A2    8/2005
(Continued)

OTHER PUBLICATIONS

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.
(Continued)

*Primary Examiner* — James S McClellan

(74) *Attorney, Agent, or Firm* — Saul Ewing LLP

(57) ABSTRACT

A method, implemented as computer code being executed by one or more processors, in which a computing device displays computer game graphics showing a gameboard with multiple game elements that are removed when matched or switched, such as in a match-3, clicker or switcher game; and in which, one or more of the processors are programmed such that: (a) to pass a level, the player has to remove a defined number of game elements of several specific collectable types which are present on the gameboard in a limited number of moves, and (b) the gameboard also displays removable elements of one or more other types that the player does not have to remove, and receives no score or points if he does remove.

48 Claims, 19 Drawing Sheets

Related U.S. Application Data filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(30) Foreign Application Priority Data

| Date | Country | Number |
|---|---|---|
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.

| | | |
|---|---|---|
| G07F 17/32 | (2006.01) | |
| A63B 71/06 | (2006.01) | |
| A63F 13/30 | (2014.01) | |
| A63F 13/40 | (2014.01) | |
| G06F 9/44 | (2006.01) | |
| A63F 13/428 | (2014.01) | |
| A63F 13/75 | (2014.01) | |

(52) U.S. Cl.
CPC .............. *A63F 13/10* (2013.01); *A63F 13/12* (2013.01); *A63F 13/30* (2014.09); *A63F 13/428* (2014.09); *A63F 13/75* (2014.09); *G06F 9/44* (2013.01); *G07F 17/32* (2013.01); *G07F 17/3274* (2013.01)

(58) Field of Classification Search
USPC .............................................................. 463/9
See application file for complete search history.

(56) References Cited

U.S. PATENT DOCUMENTS

| | | |
|---|---|---|
| 6,117,013 A | 9/2000 | Eiba |
| 7,073,792 B2 | 7/2006 | Esposito et al. |
| 7,749,060 B1 | 7/2010 | Olmes et al. |
| 8,002,633 B2 | 8/2011 | Shimizu et al. |
| 8,075,404 B2 | 12/2011 | Stamper et al. |
| 8,088,010 B1 | 1/2012 | Hill et al. |
| 8,237,743 B2 | 8/2012 | Csurka et al. |
| 8,277,320 B1 | 10/2012 | Hart et al. |
| 8,369,873 B2 | 2/2013 | Krasner et al. |
| 8,388,446 B1 | 3/2013 | Craine et al. |
| 8,526,490 B2 | 9/2013 | Buckley et al. |
| 8,672,744 B1 | 3/2014 | Steere et al. |
| 8,711,923 B2 | 4/2014 | Buckley et al. |
| 8,727,893 B2 | 5/2014 | Otremba et al. |
| 8,784,181 B2 | 7/2014 | Frank et al. |
| 8,964,830 B2 | 2/2015 | Perlman et al. |
| 9,033,803 B1 | 5/2015 | Etter et al. |
| 2002/0068632 A1 | 6/2002 | Dunlap et al. |
| 2002/0082068 A1 | 6/2002 | Singhal et al. |
| 2002/0094870 A1 | 7/2002 | Murray et al. |
| 2003/0049592 A1 | 3/2003 | Park et al. |
| 2003/0074416 A1 | 4/2003 | Bates et al. |
| 2003/0119581 A1 | 6/2003 | Cannon et al. |
| 2004/0053688 A1 | 3/2004 | Hosaka et al. |
| 2004/0137987 A1 | 7/2004 | Nguyen et al. |
| 2004/0224772 A1 | 11/2004 | Canessa et al. |
| 2005/0256985 A1 | 11/2005 | Shea et al. |
| 2006/0068876 A1 | 3/2006 | Kane et al. |
| 2006/0084494 A1* | 4/2006 | Belger ................ G07F 17/3265 463/20 |
| 2006/0160620 A1 | 7/2006 | Matthews et al. |
| 2006/0223635 A1 | 10/2006 | Rosenberg et al. |
| 2006/0277474 A1 | 12/2006 | Robarts et al. |
| 2006/0281541 A1 | 12/2006 | Nguyen et al. |
| 2006/0287098 A1 | 12/2006 | Morrow et al. |
| 2007/0077993 A1 | 4/2007 | Midgley et al. |
| 2007/0259709 A1 | 11/2007 | Kelly et al. |
| 2008/0005353 A1 | 1/2008 | Panabaker et al. |
| 2009/0170608 A1 | 7/2009 | Herrmann et al. |
| 2009/0203415 A1 | 8/2009 | Falciglia et al. |
| 2009/0209311 A1 | 8/2009 | Bennett et al. |
| 2010/0144426 A1 | 6/2010 | Winner et al. |
| 2010/0151934 A1 | 6/2010 | Kniberg et al. |
| 2010/0218135 A1 | 8/2010 | Brugler et al. |
| 2010/0227675 A1 | 9/2010 | Luxton et al. |
| 2010/0271367 A1 | 10/2010 | Vaden et al. |
| 2010/0317437 A1 | 12/2010 | Berry et al. |
| 2011/0014977 A1 | 1/2011 | Yamazaki et al. |
| 2011/0053681 A1 | 3/2011 | Goldman et al. |
| 2011/0111835 A1 | 5/2011 | Cohen et al. |
| 2011/0136561 A1 | 6/2011 | Acres et al. |
| 2011/0136572 A1 | 6/2011 | Karn et al. |
| 2011/0269532 A1 | 11/2011 | Shuster et al. |
| 2012/0030094 A1 | 2/2012 | Khalil et al. |
| 2012/0040752 A1 | 2/2012 | Koo et al. |
| 2012/0068407 A1* | 3/2012 | Yu ............................ A63F 3/02 273/236 |
| 2012/0077580 A1 | 3/2012 | Mahajan et al. |
| 2012/0079126 A1 | 3/2012 | Evans et al. |
| 2012/0122552 A1 | 5/2012 | Youm et al. |
| 2012/0191606 A1 | 7/2012 | Milne et al. |
| 2012/0198417 A1 | 8/2012 | Haviv et al. |
| 2013/0035164 A1 | 2/2013 | Osvald et al. |
| 2013/0109469 A1 | 5/2013 | Hill et al. |
| 2013/0172061 A1 | 7/2013 | Iosilevsky et al. |
| 2013/0267285 A1 | 10/2013 | Kelley et al. |
| 2013/0316832 A1 | 11/2013 | Olofsson et al. |
| 2013/0323697 A1 | 12/2013 | Shadduck et al. |
| 2013/0331162 A1 | 12/2013 | Krivicich et al. |
| 2014/0024450 A1 | 1/2014 | Ramachandran et al. |
| 2014/0080600 A1 | 3/2014 | Knutsson et al. |
| 2014/0235338 A1 | 8/2014 | Hansson et al. |
| 2014/0252987 A1 | 9/2014 | Hinrichs et al. |
| 2014/0342791 A1 | 11/2014 | Valeriano et al. |
| 2014/0357367 A1 | 12/2014 | Lee |
| 2014/0370950 A1 | 12/2014 | Jaksch et al. |
| 2015/0050997 A1 | 2/2015 | Suzman et al. |
| 2015/0174489 A1 | 6/2015 | Evald et al. |

FOREIGN PATENT DOCUMENTS

| | | |
|---|---|---|
| EP | 1870143 A1 | 12/2007 |
| EP | 2211299 A2 | 7/2010 |
| JP | 2005-228086 | 8/2005 |
| WO | WO01/46790 A2 | 6/2001 |
| WO | 2006/052212 A1 | 5/2006 |
| WO | 2007/078533 A2 | 7/2007 |
| WO | WO 2007/078533 A2 | 7/2007 |
| WO | WO 2008/109685 A2 | 9/2008 |
| WO | 2009/029108 A1 | 3/2009 |
| WO | 2010/002897 | 1/2010 |
| WO | WO 2010/045716 A1 | 4/2010 |
| WO | 2010/083346 A1 | 7/2010 |
| WO | WO 2010/096784 A1 | 8/2010 |
| WO | 2011/011466 | 1/2011 |
| WO | WO 2011/041467 A2 | 4/2011 |
| WO | WO 2012/013198 A1 | 2/2012 |
| WO | WO 2013174933 | 11/2013 |

(56) References Cited

FOREIGN PATENT DOCUMENTS

OTHER PUBLICATIONS

Anonymous, "Bejeweled 2 Wikipedia Article", Sep. 30, 2015, 1-3.
Anonymous, "Bejeweled article", Wikipedia, Sep. 30, 2015.
Anonymous, "Best iOS/Android cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.
Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.
Anonymous, "Buck Rodgers Turn Based Strategy Game Design and Planning Document", https://cs.nyu.edu/courses/spring07N22.0474.001/groups/tbsgame/tbsgame_des.pdf, Feb. 21, 2007.
Anonymous, "Candy Crush Saga Facebook Game levels 1-10 video on YouTube, YouTube screen shorts figures 1-7", https://www.youtube.com/watch?v=8TIeNDnJiN8, Apr. 15, 2012.
Anonymous, "Candy Crush Saga for Facebook, YouTube video demonstrating levels 1-10, video length 15:23", https://www.youtube.com/watch?v=cfqHVkWX5yE, Apr. 12, 2012, 1 page.
Anonymous, "Candy Crush Saga on Facebook Review on YouTube video, Screen shots of YouTube video, figures 1-13", https://www.youtube.com/watch?v=AbH8Givg6XM, Sep. 7, 2012.
Anonymous, "Cross-platform", retrieved from the Internet: URL:http://en.widipedia.org/w/index.php?title=Cross-platform&oldid=487867404 [retrieved on Jul. 1, 2013] XP055068984, Apr. 17, 2012, pp. 1-16.
Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.
Anonymous, "Dig Dug article", Wikipedia, Sep. 30, 2015.
Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.
Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.
Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.
Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.
Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.
Anonymous, "Minecraft", retrieved from the Internet: URL:http://en.widipedia.org/w/index?title=Minecraft&oldid=409326251 [retrieved on Jul. 1, 2013] XP055068987, May 2, 2014.
Anonymous, "Model-view-controller", retrieved from the Internet: URL:http://en.widipedia.org/w/index/php?title=Model%E2%80%93view%E2%80%93controller&oldid=511810952 'retrieved on Oct. 8, 2013] XP055083072, Sep. 11, 2012, pp. 1-2.
Anonymous, "OpenOffice, Creating Charts and Graphs", Dec. 2004, 1-17.
Anonymous, "Pygame", retrieved from the Internet: URL:http://web.archive/org/web/20120413123244/http://www.pygame.org/wikinut_design [retrieved on Oct. 8, 2013 XP055083074, Apr. 13, 2012, pp. 1-5.
Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.
Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.
Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.
Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.
Josef, "Bloxley Tutorial #1—Sokoban", http://bloxley.net/2010110/tutorial-1-sokoban, Oct. 13, 2010.
Murphy, "Bejeweled 2 Strategy Guide", www.bigfishgames.com, Aug. 15, 2010.
Namco, "Dig Dug Video Game", 1982.
Popcap, "Bejeweled Video Game", 2001.
Rua, "Candy Crush Saga Gameplay First Look (Episode 1-10 levels)", retrieved from the Internet: URL: https://www.youtube.com/watch?v=8TIeNDnJiN8 [retrieved on Apr. 16, 2015] XP054975821, Apr. 15, 2012.
Schoenau-Fog, "The Player Engagement Process—An Exploration of Continuation Desire in Digital Games", http://www.digra.org/wp—content/uploads/digital-library/11307.06025.pdf, 2011.
Squires, "Bubble Witch Saga is going mobile—Gamezebo", retrieved from the Internet: URL:http://www.gamezebo.com/news/2012106127/bubble-witch-saga-going-mobile [retrieved on Dec. 9, 2013] XP055092339, Jun. 27, 2012, pp. 1-2.
Anonymous: "Why King.com's Candy Crush is crushing it on Facebook," XP055085338, retrieved from the Internet: URL: http://blog.games.com/2012/05/01/why-king-coms-candy-crush-is-crushing-it-on-facebook/ [retrieved on Oct. 25, 2013, pp. 1-4 (May 1, 2012).
Anonymous: "Facebook Spiel Candy Crush Saga: Cheats, Tipps, News and Videos BILDspielt," XP055085339, retrieved from the Internet: URL: http://www.bildspielt.de/social-games/3-gewinnt/candy-crush-saga-180643/ [retrieved on Oct. 25, 2013], pp. 1-10 (Apr. 12, 2012).
Collins: "Will Collins Game Spotlight: Candy Crush Sage," XP055085345, retrieved from the Internet: URL:https//developers.facebook.com/blog/post/2012/06/15/game-spotlight—candy-crush-saga/ [retrieved on Oct. 25, 2013], pp. 1-2 (Jun. 15, 2012).
"King.com Skill Games for iPhone and Facebook: http://www.ubergizmo.com/2009/07/king-com-skill-games-for-iphone-and-facebook/", XP055085351, retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM:&imgrefurl=http://www.ubergizmo.com/2009/07/king-com-skill-games-for-iphone-and-facebook/&docid=fJQdwQQyyLis3M&imgurl=http://cdn.ubergizmo.com/photos/2009/7/Amazon-s [retrieved on Oct. 25, 2013], pp. 1-2 (Jul. 13, 2009).
International Search Report, dated Jan. 17, 2014, and Written Opinion, issued in corresponding International Application No. PCT/EP2013/069284.
Anonymous, "Salesforce Tutorial—Model View Controller (MVC)", [online] Retrieves from the Internet: <https://web.archive.org/web/20130814042919/http://www.salesforcetutorial.com/model-view-controller-mvc/> [retrieved Jul. 1, 2016], Apr. 10, 2013.

* cited by examiner

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

Field of the Invention

The invention relates to casual social games.

Technical Background

There are multiple technical challenges facing the designer of computer-implemented games to create a fun and compelling game. Three of these challenges can be broadly categorised into the following areas: 'engagement'; 'viralisation' and 'monetisation'.

We will look first at 'engagement', which involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has a social aspect—for example if it is linked to a social network so that game players can interact with their friends within the social network. The game can then transform into something that goes far beyond a solo game experience and becomes more like a shared journey.

'Viralisation' requires a game to include various techniques that encourage players to share the game with others, encouraging others to play the game. It is a key technique in enabling mass-scale distribution or penetration of games. Viralisation can be especially effective when the game is integrated into or connected to a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will require a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

A 'match-3 game' is a type of casual puzzle game where the player is required to find patterns on a seemingly chaotic board. The player then has to match three or more of the same type of game element on the game board and those matched elements will then disappear.

One variant of casual games are the so called 'clicker' games where the player can click on a group of adjacent game elements of a certain type and those will then be removed. Some clicker games only require two adjacent objects to remove those elements if clicked by the user.

Another type of match-3 games are the so called 'switcher' games where the player switches place on two adjacent game elements on the game board so that one or both of them create a chain of at least three adjacent game elements of the same type. Those matched game elements will then disappear. In a typical switcher game the game board will be repopulated with game objects from the top of the board with the physics of the game board being that the game pieces are falling downwards on the board.

Another type of match-3 game are the so called 'shooter' games where the player launches for instance a ball or bubble on to the game board tying to aim at groups of similar game elements already on the game board. If the launched ball hits or forms a group of more than 3 similar game elements then that group of game elements are removed from the game board. In a typical shooter game the physics of the game board being that the game pieces are falling downwards on the board.

There are also other types of games where groups of certain game elements are combined together and removed once they have reached a certain size. The user can connect the groups with a swiping movement, touching each of the connecting elements in one implementation. In another implementation the groups are formed into one group when elements of the same type are adjacent, the player then removes the group for instance by clicking on that group.

This patent specification describes not only various ideas and functions, but also their creative expression. A portion of the disclosure of this patent document therefore contains material to which a claim for copyright is made and notice is hereby given: Copyright King.com Limited 2012 and 2013 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DISCUSSION OF RELATED ART

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which a computing device displays computer game graphics showing a gameboard with multiple game elements that are removed when matched or switched, such as in a match-3, clicker or switcher game;

and in which, one or more of the processors are programmed such that:

(a) to pass a level, the player has to remove a defined number of game elements of several specific collectable types which are present on the gameboard in a limited number of moves, and (b) the gameboard also displays removable elements of one or more other types that the player does not have to remove, and receives no score or points if he does remove.

Any one or more of the following optional features may be included, resulting in a method:

- in which a processor is programmed such that a bonus number+X is applied to a game element on the gameboard and displayed as a bonus number X adjacent to that element, and removing that element is handled by the processor as being equivalent to removing X+1 elements of that type.
- in which a processor is programmed such that, when the player makes a match of elements, such as the collectable types, that leads to elements being removed from the gameboard, and then any remaining adjacent elements that are also of one of the collectable types is allocated a bonus number.
- in which a processor is programmed such that removing elements causes new elements to move into position on the gameboard, creating further matches, then any remaining adjacent elements that are also of one of the collectable types is allocated a bonus number.
- in which a processor is programmed such that a bonus number+X is applied to every collectable game element on the gameboard within a defined region, such as a region covered in grass.
- in which a processor is programmed such that if the player removes more than the defined number of game elements of all of the specific collectable types, then the processor causes the game to enter a new mode, such as a 'Hero mode', in which some of the game elements on the board are automatically allocated a bonus number
- in which a processor is programmed such that the extent to which the player removes more than the defined number of game elements is counted and a number of bonus items, such as green beans, is allocated to the player depending on this extent.
- in which a processor is programmed such that the number of bonus items is relevant to another level, such as a 'Boss' level, in which the objective is to remove a defined number of game elements of several specific collectable types in order to defeat a character, such as a Boss character, and the bonus items can be used to purchase a bonus number to be applied automatically to one or more game elements or to a matched combination of game elements in order to make the level easier.
- in which a processor is programmed such that the defined number of game elements of several specific collectable types is displayed on screen
- in which a processor is programmed such that the number of a specific single type of collectable element is relevant to completing a level and is displayed to the player,
- in which a processor is programmed such that the defined number of game elements of several specific collectable types is not displayed on screen
- in which a processor is programmed such that the number of a specific single type of collectable element is not relevant to completing a level, but instead the total number of all collectable types is relevant
- in which a processor is programmed such that the gameboard includes a type of collectable element that cannot be removed by being included in a match
- in which a processor is programmed such that the gameboard includes special blocking elements that can only be removed after there have been multiple matches to remove adjacent elements, such as a three matches at separate times
- The special elements are shown as items whose appearance changes after each match of adjacent elements
- A sound effect accompanies the change of appearance
- The special element is a flower that progressively opens after each match of adjacent elements
- A goal of the level is to remove a set number of these special elements
- in which a processor is programmed such that the elements include one or more of the following, each with animated faces: vegetables, animals, candies, sun, moon, flowers.
- in which a processor is programmed such that a collectable element evolves in stages each time it is included in a matching combination
- In which the collectable element is an egg and a combination of three eggs creates a cracked egg, and a combination of three cracked eggs creates an animal, such as a duckling or chick, that flies off the gameboard; and one of the goals for a level is to collect one or more of these animals.
- in which a processor is programmed such that an element on the gameboard is a bucket that progressively fills with water each time there is a match of elements adjacent to it and that element can spill over after a set number of matches adjacent to it, causing collectable elements to be shown on the gameboard.
- in which a processor is programmed such that reaching targets for a level earns a player stars, and earning 1 star earns the player an animal of one species, earning two stars earns the player a different species and earning three stars earns the player a still different species.
- in which a processor is programmed such that, if the player earns a collection of one group of different species, then that collection entitles the player to one type of booster; and if the player earns a collection of a different group of species, then that collection entitles the player to a different type of booster.
- in which some or all game levels are untimed, eliminating any time pressure
- in which the game is a casual, social game and some or all levels have a true fail, to enable monetization through purchasing extra moves;
- in which there is a continuous musical soundtrack plays during gameplay in which the game generates and displays congratulatory messages when the player scores more than a predefined amount, or matches more than a predefined number of game elements, in a single move in which there is an algorithm for automatically detecting when there are no possible moves left in which there is an algorithm for re-shuffling the elements on the game board.

in which a processor generates, if no move has been made for a while, help or hints by brightening and enlarging game elements used in a possible move on the board with a flashing animation, such as an animation that occurs once, or repeats twice or thrice in which a processor is programmed to require a player to reach a target score before running out of moves in order to complete a level successfully, but completing the level is not timed in which a processor is programmed to automatically replenish a life for a player in 30 minutes in which a processor is programmed so that, if a player finishes a level in under the target number of moves, then random game elements on the game board are triggered and give the player bonus points in which a processor is programmed so that, if a level is finished with moves left, those moves are converted to special game elements that trigger for extra bonus points in which a processor is programmed so that the game generates and displays congratulatory messages when the player scores more than a predefined amount, or matches more than a predefined number of game elements, in a single move in which a processor is programmed so that the player can ask his friends for lives in which a processor is programmed so that the player can ask his friends for other help in which social network friends are prompted to assist another player if that other player has played, but not completed, a level meeting a certain criteria in which a processor is programmed so that the player can send gifts to friends in which a processor is programmed so that the game can be synchronized between different devices in which a processor is programmed so that a player can seamlessly stop and re-start playing the game at any time since game state information is stored, e.g. remotely and/or on the playing device in which every change in the game state, such as every move of a game piece by the user, and every consequential change in every game piece on the game board, is accompanied by sound and visual feedback to provide immediate, positive gratification to the player in which game state information is preserved, enabling a remote server system to identify a player and all aspects of the state of the game they are playing, so that the player can end game play on one device and resume from a different device at a later time at exactly the same state in which the different device can be a different type of device, so that the player can move seamlessly between playing the game on a smartphone and on a tablet in which a remote server system can identify a player because that player has accessed the game through a social network in which the game is a casual, social game, namely a game that can be downloaded as an app to a smartphone and/or tablet computer and which can be accessed or played using a social network application or environment in which the processor is programmed to show a virtual path or other virtual world that indicates the level reached by the player and that player's social network friends in which the design of the game is optimised through a process including the step of: using data analytics to understand the impact of changes to the game design in terms of player engagement and/or monetisation and/or viralisation and; implementing changes to the game design, including frequent changes such as daily or weekly changes, to optimise player engagement and/or monetisation and/or viralisation.

Various additional aspects can each be combined with any of the above.

A second aspect is:

A method, implemented as computer code being executed by one or more processors, in which a computing device displays computer game graphics;

and in which, one or more of the processors are programmed such that boosters or charms are displayed and their number or strength re-charges or automatically increases over time, irrespective of whether the game is being played or not.

The boosters or charms are, optionally, not tied to a single level of the game, but can be used on multiple different levels.

A third aspect is:

A method, implemented as computer code being executed by one or more processors, in which a computing device displays computer game graphics and a goal is set to complete a level;

and in which one or more of the processors are programmed such that the player can continue playing even after the goal of a level has been reached to earn additional points or bonuses.

A fourth aspect is:

A method, implemented as computer code being executed by one or more processors, in which a computing device displays computer game graphics showing a gameboard with multiple game elements that are removed when matched or switched, such as in a match-3, clicker or switcher game and a goal is set to complete a level;

and in which one or more of the processors are programmed such that a goal of a level is to collect a number of blocking elements, namely elements that cannot be removed from the gameboard by being matched with other similar elements.

The gameboard may include special blocking elements that can only be removed after there have been multiple matches to remove adjacent elements, such as a three matches at separate times. Further optional features are that:

The special elements are shown as items whose appearance changes after each match of adjacent elements The special element is a flower that progressively opens after each match of adjacent elements A goal of the level is to remove a set number of these special elements A fifth aspect is:

A method, implemented as computer code being executed by one or more processors, in which a computing device displays computer game graphics showing a gameboard with multiple game elements that are removed when matched or switched, such as in a match-3, clicker or switcher game;

and in which one or more of the processors are programmed such that some special tiles of the gameboard automatically make game elements worth more when those elements are positioned on those tiles.

The special tiles may be visually distinct from other tiles

A sixth aspect is:

A method, implemented as computer code being executed by one or more processors, in which a computing device displays computer game graphics;

and in which one or more of the processors are programmed such that a pop-up window appears to alert the player to when another player, connected to the player as a friend over a social network and also playing the game, has been beaten on a specific level of the game.

A seventh aspect is:

A method, implemented as computer code being executed by one or more processors, in which a computing device displays computer game graphics;

and in which one or more of the processors are programmed such that a pop-up window appears to alert the player to when another player, connected to the player as a friend over a social network and also playing the game, has overtaken that player to reach a higher level in the game.

An eight aspect is:

A method, implemented as computer code being executed by one or more processors, in which a computing device displays computer game graphics;

and in which one or more of the processors are programmed such that a pop-up window appears to alert the player to when another player, connected to the player as a friend over a social network and also playing the game, has been overtaken by that player, ie the player is now at a higher level in the game.

A ninth aspect is:

A method, implemented as computer code being executed by one or more processors, in which a computing device displays computer game graphics including graphics for a path in a virtual world, with nodes along the path each corresponding to a level in the game;

and in which one or more of the processors are programmed such that each node includes an animated face that alters when a level is completed.

A tenth aspect is:

A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device;

and in which, one or more of the processors are programmed such that:

(a) to pass a level, the player has to remove a defined number of game elements of several specific collectable types which are present on a gameboard in a limited number of moves, and (b) the gameboard also displays removable elements of one or more other types that the player does not have to remove, and receives no score or points if he does remove.

An eleventh aspect is:

A non-transitory computer readable medium encoded with instructions for controlling a computer system to display a game on a display, the instructions require, for the player to pass a level, that the player has to remove a defined number of game elements of several specific collectable types which are present on a gameboard in a limited number of moves, and the gameboard also displays removable elements of one or more other types that the player does not have to remove, and receives no score or points if he does remove.

DETAILED DESCRIPTION

Figure 1:
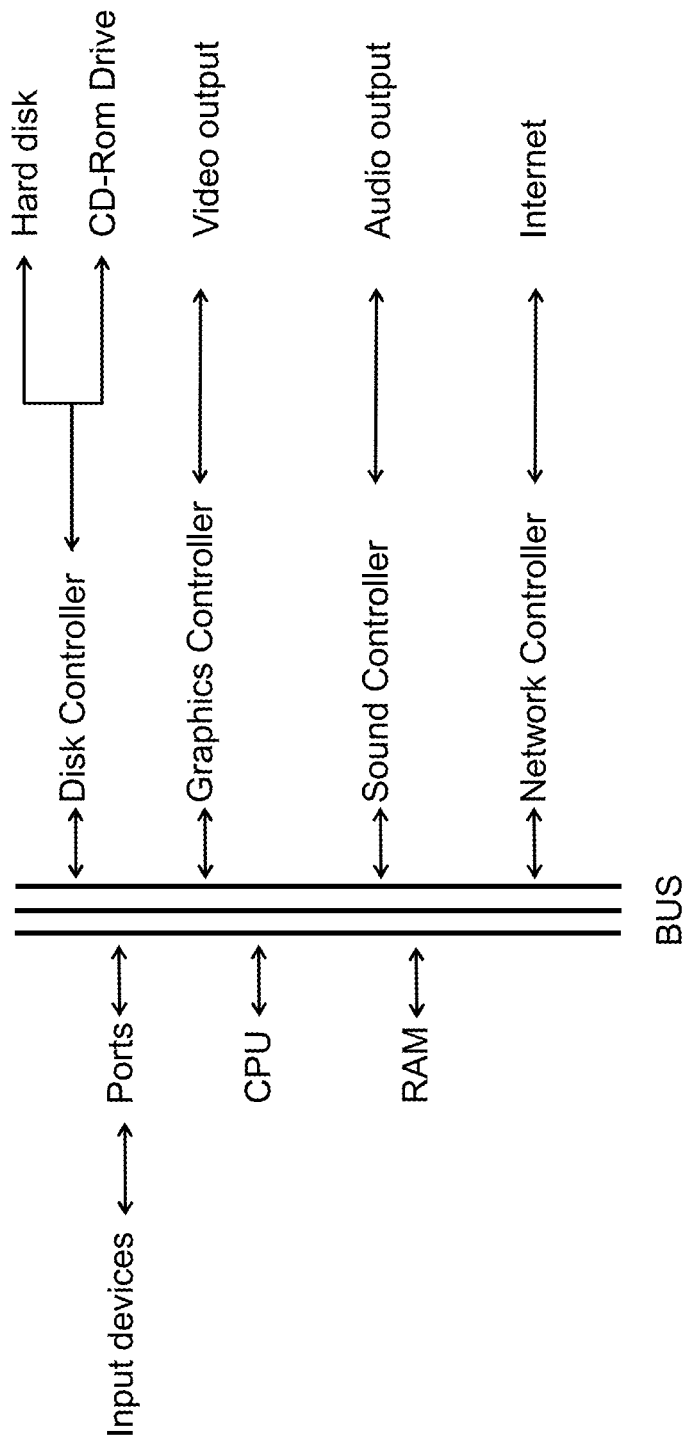
FIG. 1 shows a schematic illustration of a computing device.

The techniques described in this patent may be deployed in different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture, but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network, with which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game are not exhaustive, what is described herein are certain preferred embodiments. It is possible to implement the game, in a number of variations without departing from the spirit or scope of the invention.

The techniques described in this patent are to a great extent embodied in King.com's game Farm Heroes Saga™, it is however understood that the inventions described can be implemented in many different ways and it is not intended to be limited to only one game.

The terms user and player are used interchangeably throughout this specification and no specific meaning is intended when using either term, unless the context suggests otherwise.

In the following description of various implementations of the invention, reference is made to the accompanying drawings, which form a part thereof, and in which is shown by way of illustration, various implementations in which the invention may be utilized. It is to be understood that other implementations may be utilized, and structural and functional modifications may be made without departing from the scope of the present invention.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates for instance with the internet, through wireless or wired connections. A user may interact with the computing device through input devices, such as a touch screen, pointing device (e.g. a mouse) or a keyboard.

Figure 2:
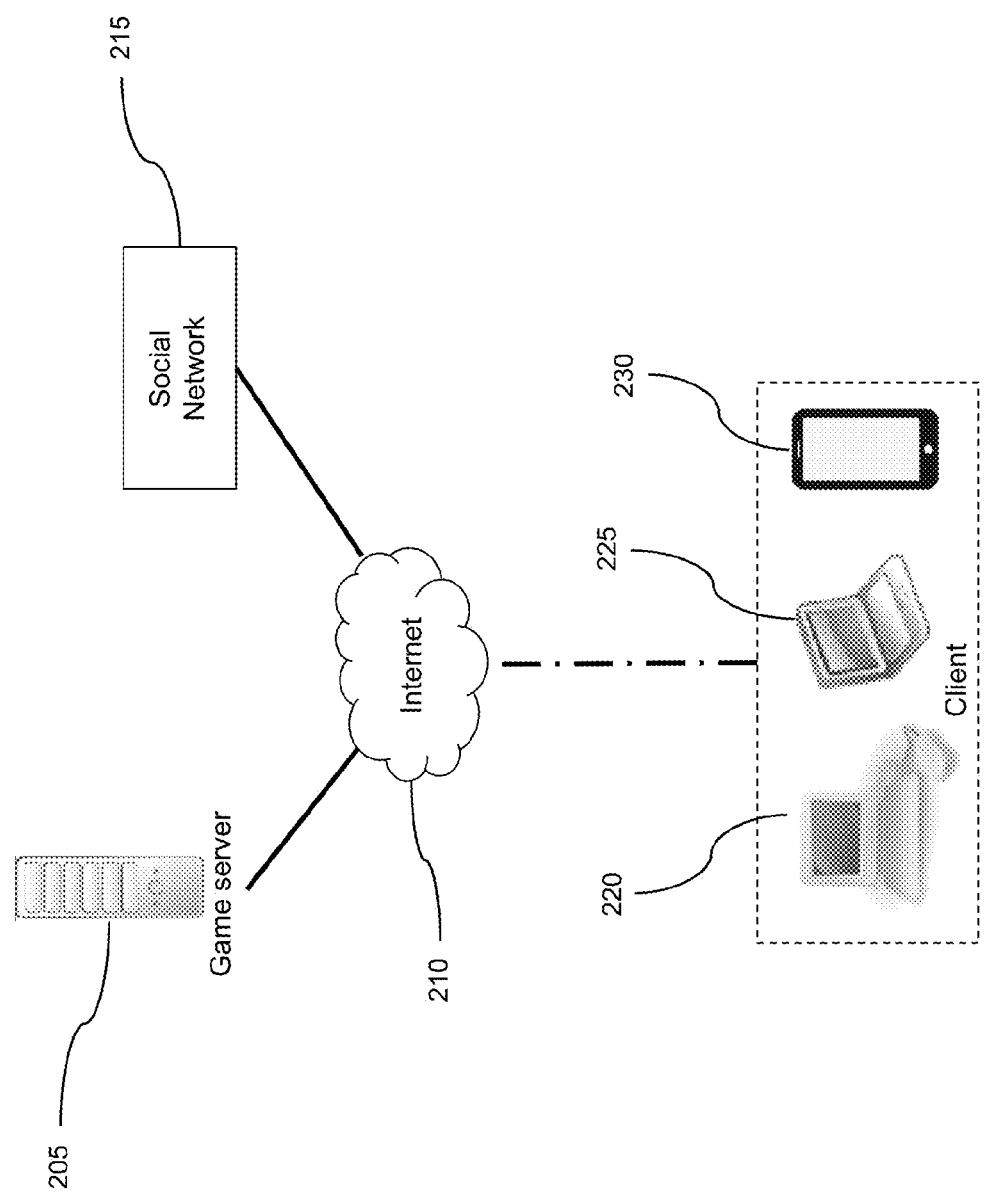
FIG. 2 shows an exemplary environment.

FIG. 2 illustrates an exemplary overall environment in which the present invention can be utilized. A virtual game is stored on for instance a game server 210. The virtual game is to be played on a client device, such as a computer 240, 250, a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other networks. It should be understood that the social network 230 and the game server 210 does not have to be located in different places, they could be on the same server or on a plurality of servers located in different locations. An environment where the invention may be implemented is described in PCT/EP2013/060641 which is hereby incorporated by reference. People skilled in the art will understand that devices other than the exemplary ones listed can be also be used without departing from the spirit and scope of the invention.

Gameplay

Figure 3:
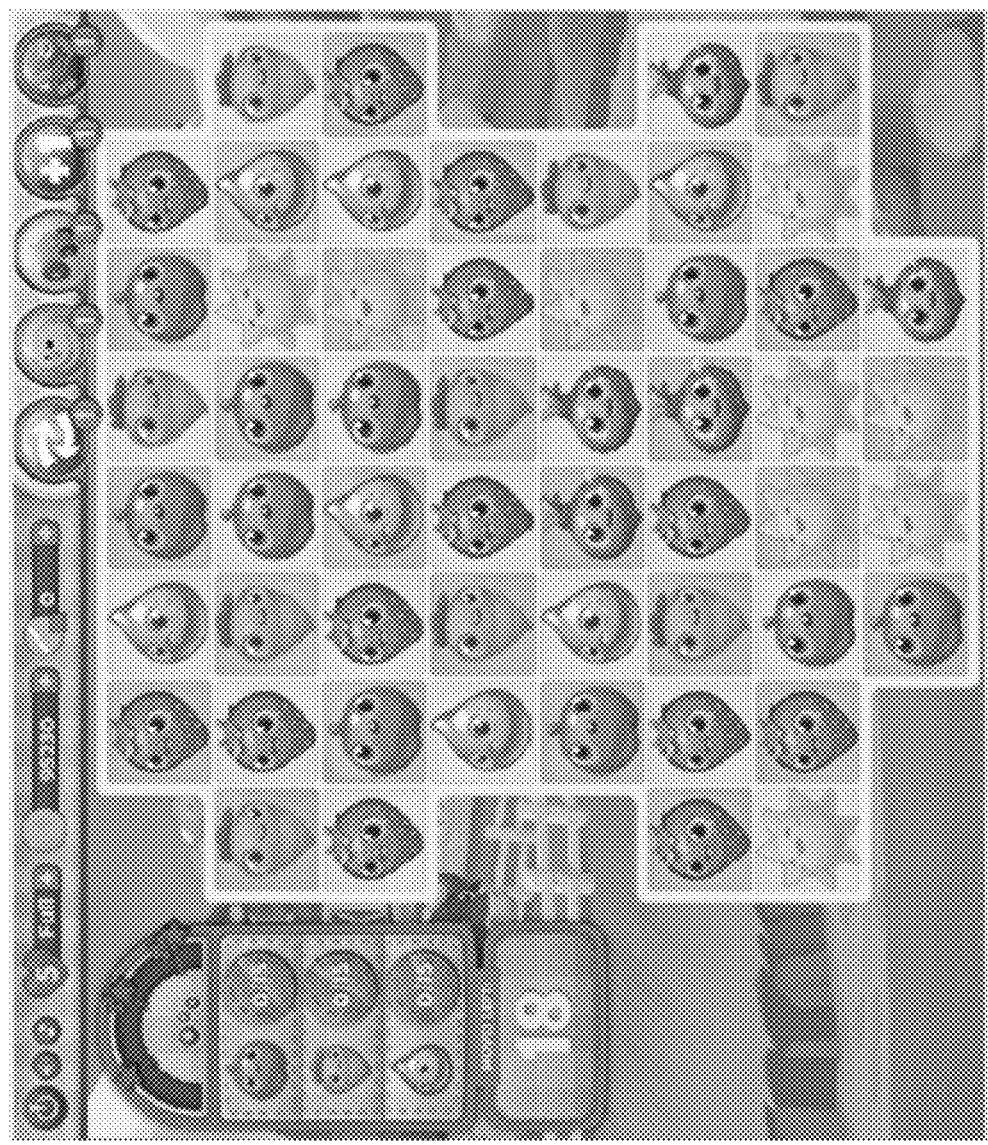
FIG. 3 shows an exemplary implementation of a game board.

The game described is a match-3 switcher game. The player is presented with the game board in a grid like shape with different types of game elements placed on each tile in the grid. An exemplary implementation of the game can be seen in FIG. 3 where the game board is implemented in a non-rectangular shape. It is understood by a person skilled in the art that the game board can be implemented with various layouts.

The game board is populated with different kinds of game elements, which may have different shapes and/or colour to be easily identifiable by the player. The number of different types of game elements that are used on a level may vary depending on the desired level of skill needed to complete the level. Some game board layouts may be easier with more or less types of game elements on the game board.

To play the game, game elements on the game board are swapped with each other to make moves on a game board. To gain points the player has to make moves that create matches of at least three of the same type of game element. In doing so, the player gains points and the matched game elements are removed from the game board. As a result, new game elements fall into place from the top of the game board in order to fill any empty spaces created.

The game may be implemented with different goals for different levels, which the player has to complete. One such goal is for the player to collect a defined number of a certain type of game element within a limited number of moves. The types of game elements to collect are for example shown to the left of the game board in FIG. 3.

Once all required game elements have been collected, the game will continue until the player is out of moves. The player is rewarded based on if he meets the goal of the level and also by the number of game elements over the goal that he has collected. The player can be rewarded with for instance a high score on the level. The reward can also be an in-game currency or reward that can be used to trade for some value in the game.

Game Modes

The game may be implement with different game modes. The game modes may be used for one level as one goal or type of game or the game modes can be combined to give a different gaming experience.

One game mode has been described, to collect certain game elements. The user can, in an alternative game mode, be asked to indicate one of the types of game elements for which he will reach the level goal. The user can in some implementations be asked to wager on the fact that he will reach that target and a reward will be a paid out in relation to that target game goal. The player may wager with in-game currency, such as a currency that he has purchased with real-world money. In some implementations the player may be able to wager with in-game currency that he has received for good gameplay and that he cannot exchange for real-world money.

The goal of collecting certain game elements can be implemented so that the player may not only have to collect standard game elements. Certain special game elements may be used on the game board and there are for instance different combinations of moves that the player has to achieve in order to activate, collect or use those game elements. We will below describe some different types of special game elements that can be implemented.

Figure 4B:
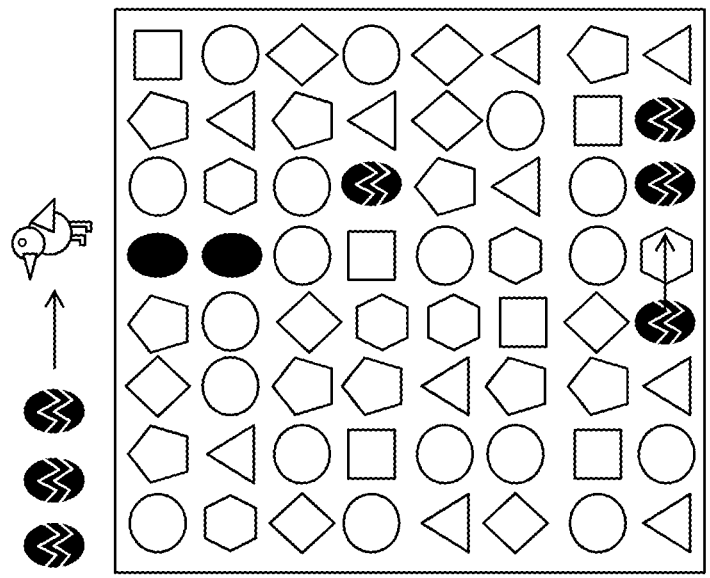
FIGS. 4a and 4b show a game element that needs two matches to be removed.
Figure 4A:
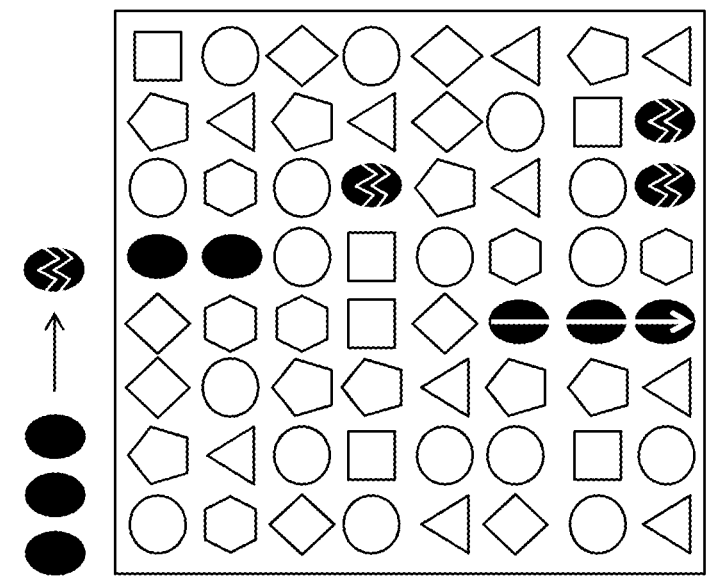

FIGS. 4a and 4b show a special game element that can be implemented for instance as eggs and chickens. These game elements need to be included in two combinations to be fully removed from the game board. The game element the player is supposed to collect is chickens, e.g. a hatched egg, but they are visible only as an egg in the game field. The first match of three 'eggs' results in that the three 'eggs' are replaced with a 'cracked egg', this is illustrated in FIG. 4a. The next time the new 'cracked egg' game element is included in a match of two or more 'cracked egg' elements it will reveal another element inside, which in one implementation is a 'chicken', this is illustrated in FIG. 4b. The chicken element does not remain on the game board but is removed and may be counted to the game goal of that level.

If the eggs are matched in a combination of 4 eggs then the cracked egg will be worth +1 if it would be collected. If the eggs are matched in a combination of 5 eggs then the cracked egg will be worth +2 if it would be collected.

Figure 5:
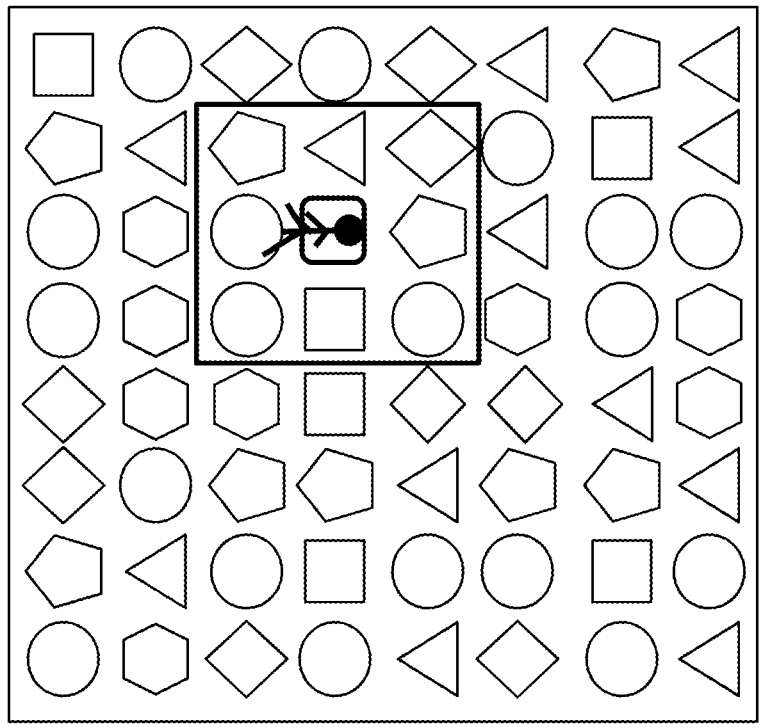
FIG. 5 shows the growing game element.

Another special game element is a 'growing game element' exemplified in FIG. 5. This game element may be one of the elements that should be collected to meet a goal on one level. The game element may in some implementations be static on the game board. For the player to collect the game element, the player needs to make a number of matches of game elements adjacent to the growing game element. The game element may for instance require four matches next to it to be collected. In some implementations this growing game element can be implemented as a crop or flower that changes appearance depending on the number of matches that have been made next to it.

An alternative implementation of the growing game element requires the player to make a match in all the 8 spaces surrounding the growing game element (or less if places next to for instance an edge or a rock). As soon as the player has made a match in all spaces, the growing game element grows and 1 unit is collected. The game element may be implemented to indicate which of the tiles surrounding it have been included in a match, so that the player does not have to remember which tiles he should include in a match in order to collect from the growing game element.

Figure 6:
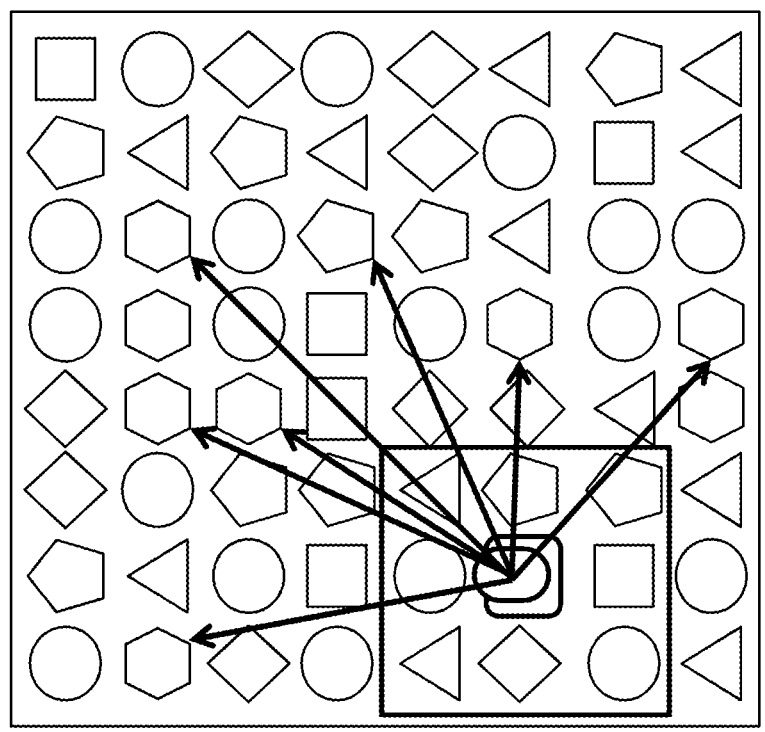
FIG. 6 shows a game element.

Yet another special game element is exemplified in in FIG. 6. In one implementation this special game element can be in the form of a water sprout. The water sprout may, in one implementation, be activated once a player has made a match in all the 8 spaces surrounding the growing game element (or less if places next to for instance an edge or a rock). When all the spaces have been used, the sprout will spurt out a number of 'water' game elements that replace a set of random normal objects in the field. The water game elements are standard collectibles, but they are not part of the objects that fall in from the top of the screen in this mode. The added water game elements will be introduced with a +1 value on the game board. This added value will deplete, as for regular game elements.

The game may be implemented so that for each match of three or more game elements on the game board, each of the adjacent game elements that do not form part of the match will get +1 in value if they are collected from the game board. So in the game modes where the player is required to collect certain game elements from the game board a regular game element counts as 1. A game element with +1 point/value counts as 2 collected game elements and +2 counts as 3 collected game elements and so on. Every turn, however, all elements with an added value will loose one value or in some implementations they will go back to be valued only as one element. In some instances one move/switch of game elements may create several matches and the some game elements may therefore get more then +1 in value at any give time. There may also be bonus modes where certain game elements get upgraded with +1 or another value.

Figure 7:
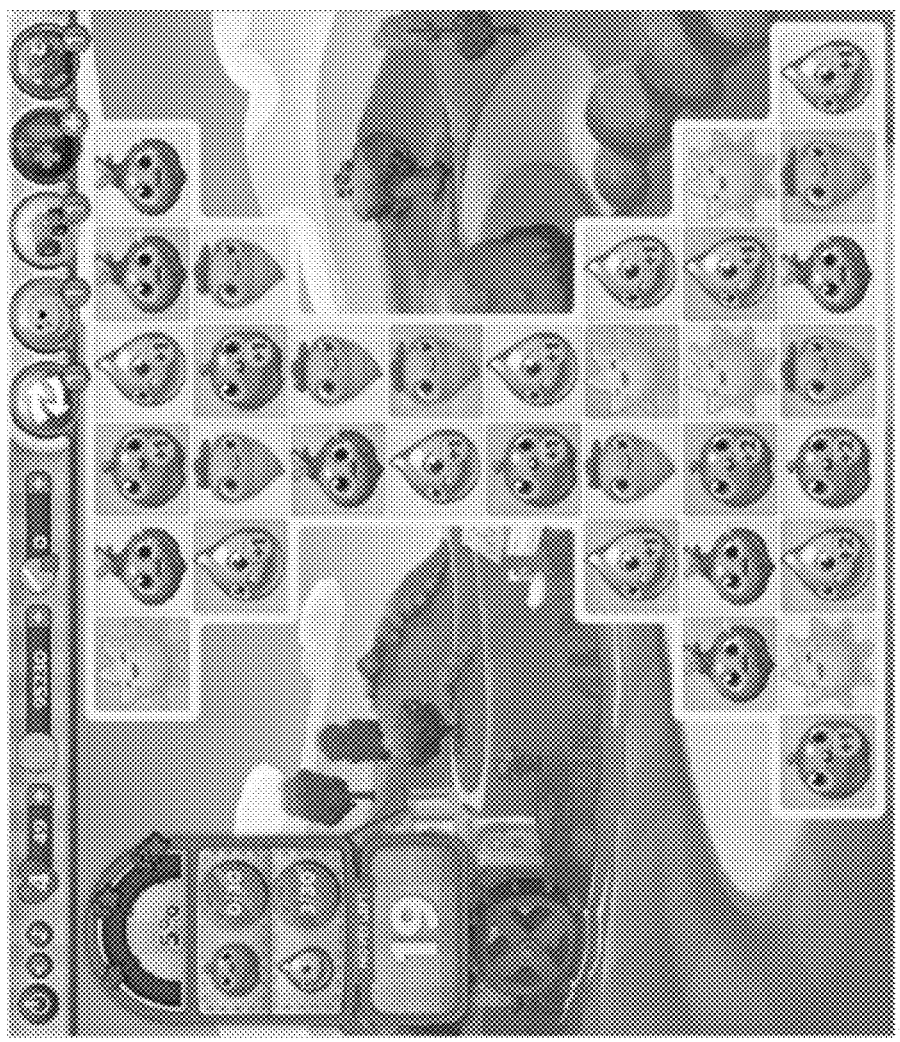
FIG. 7 shows the +1 mechanic.

The +1 value may be revealed for the player for instance when he hovers the mouse pointer over that game element. It may, in another implementation, be represented as a number within a circle superimposed over the game element on the game board, as shown in FIG. 7. If the number is constantly shown in relation to the game element this will help the player to evaluate the value of available moves.

Collection Levels

Figure 8:
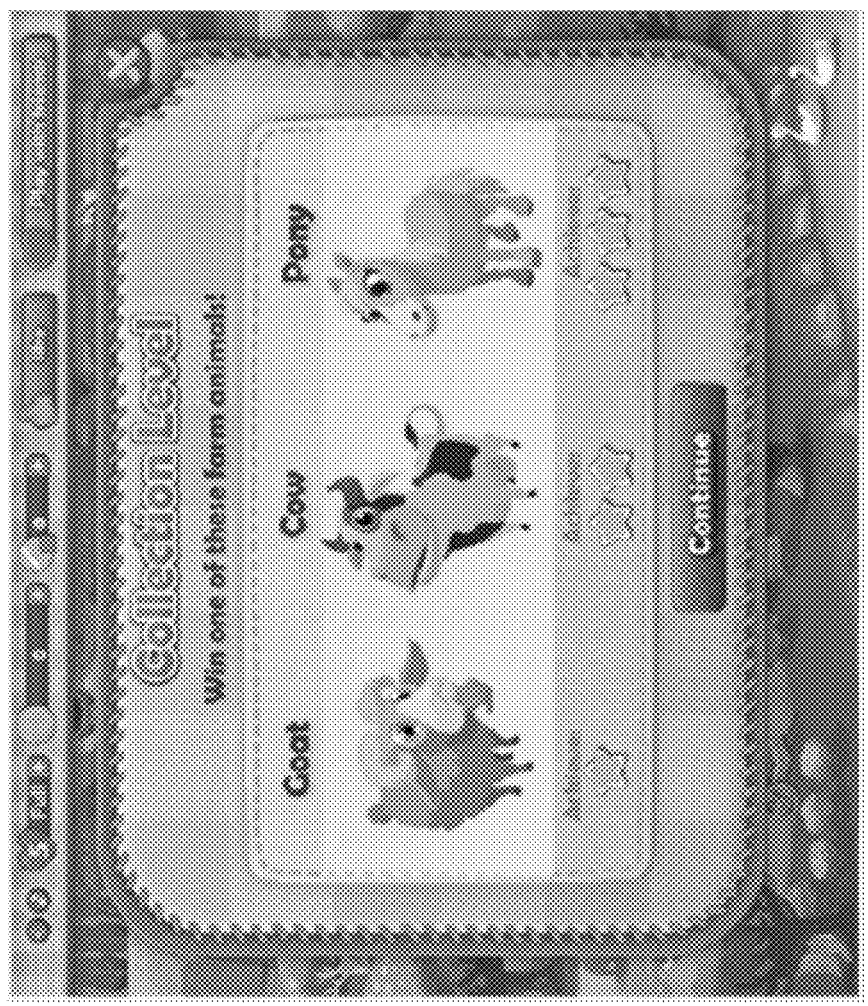
FIG. 8 shows an example of items that the player can collect.

There may be additional features in some levels that enhance the gameplay or other aspects such as retention and monetization. One such feature is 'Collection levels' which play out in a similar way to normal levels with the addition of the option to collect cute animals such as the ones shown in FIG. 8.

The collection levels may be spread out over the levels the players can play in the game. In the type of implementation shown in FIG. 12 there may be a collection level per 'episode' or 'chapter' in the game. The collection levels may be indicated with, for instance, a different game node on the map. In each collection level there are three animals that may be collected depending on how well the player does on the level. The higher the score, the more animals will be collected. The number of animals collected may be tied to other reward systems for the levels, such as the number of stars the player earns for that level.

Figure 9:
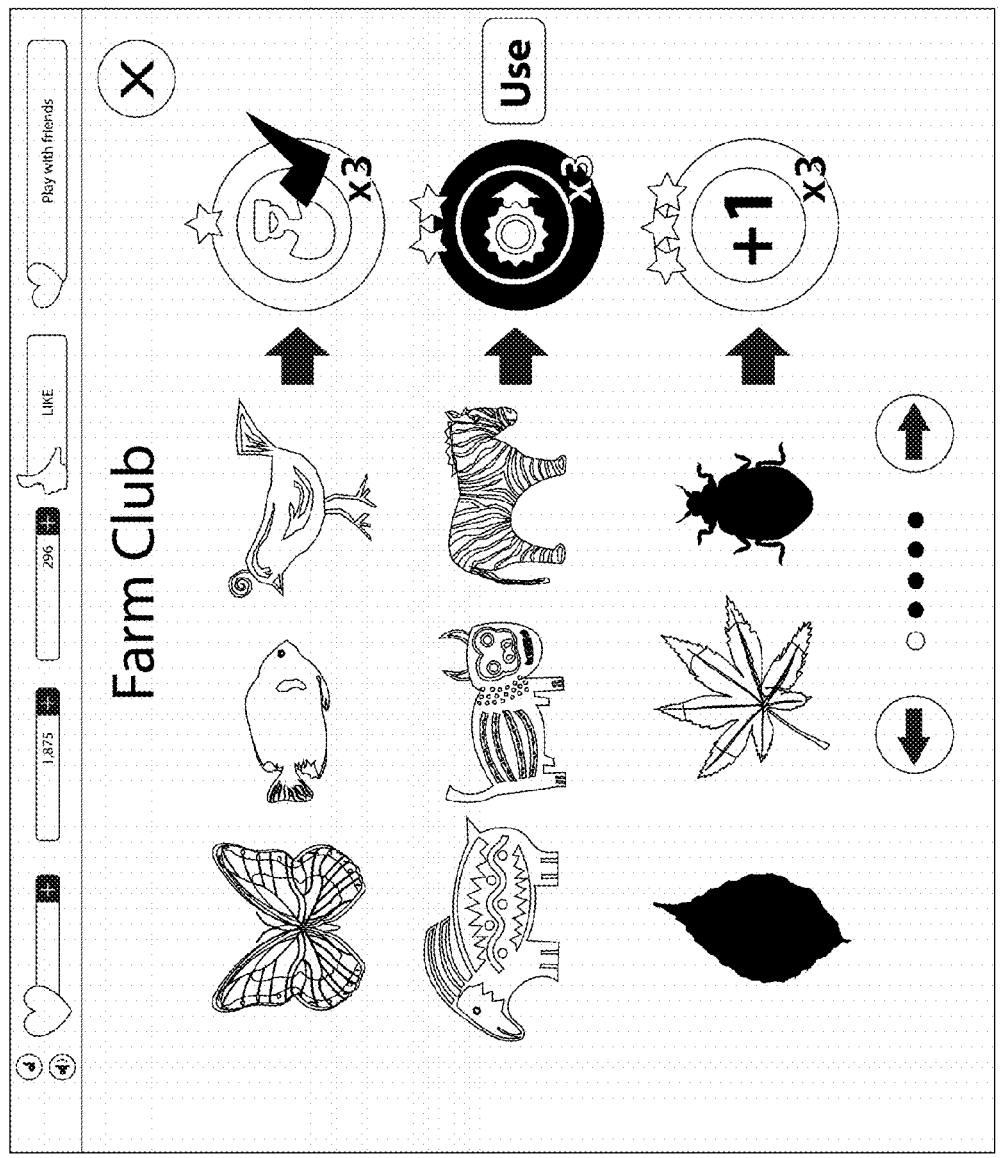
FIG. 9 shows an exemplary implementation.

The player can access a table where the collected animals are shown. FIG. 9 shows an exemplary implementation of where the collected animals can be shown. In the shown implementations the collected/unlocked animals count towards a reward, in this case one or several free boosters. Different implementations may require different number of animals to unlock the boosters.

Boss Levels

Figure 11:
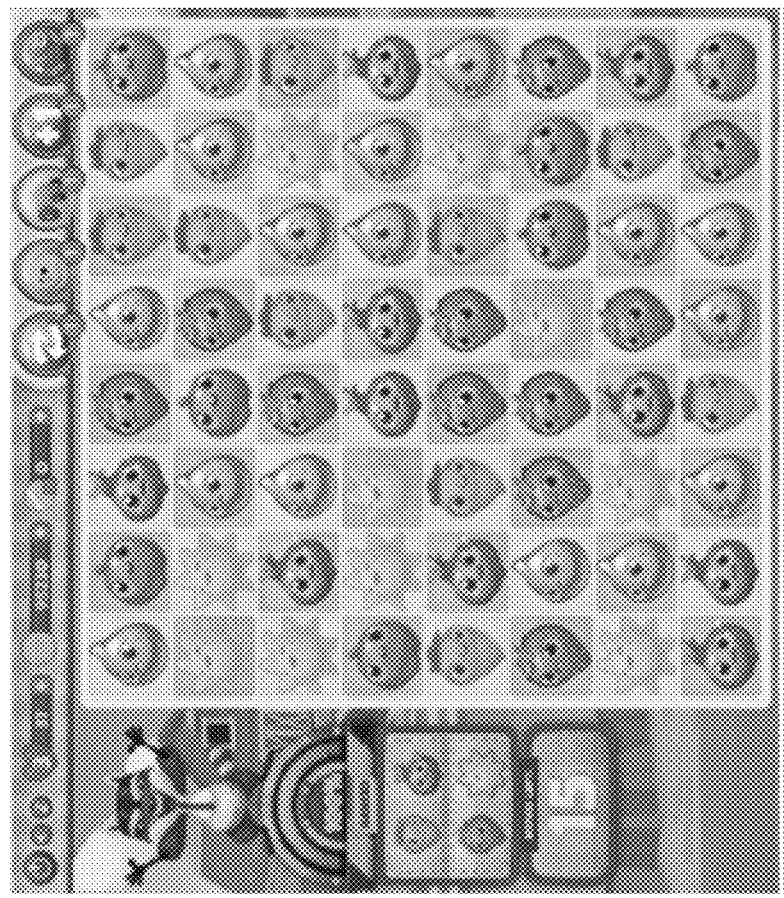
FIG. 11 shows a boss level.

The game can be implemented with certain levels where the player has to defeat a character in the game. The levels may be similar to regular levels with the added challenge of defeating a character by collecting a certain amount of all or some of the available game elements. The game may be implemented so that the boss' health is represented with an arched meter such as the one shown in FIG. 11. The standard Growth Bar may be replaced with a Health Bar that the player must reduce to zero. The player will typically be presented with which of the game elements that will count against defeating the boss. It may, however, not be disclosed how many game elements need to be collected in order to defeat the boss and complete the level, although the total 'damage' made to the boss may be shown.

Figure 10:
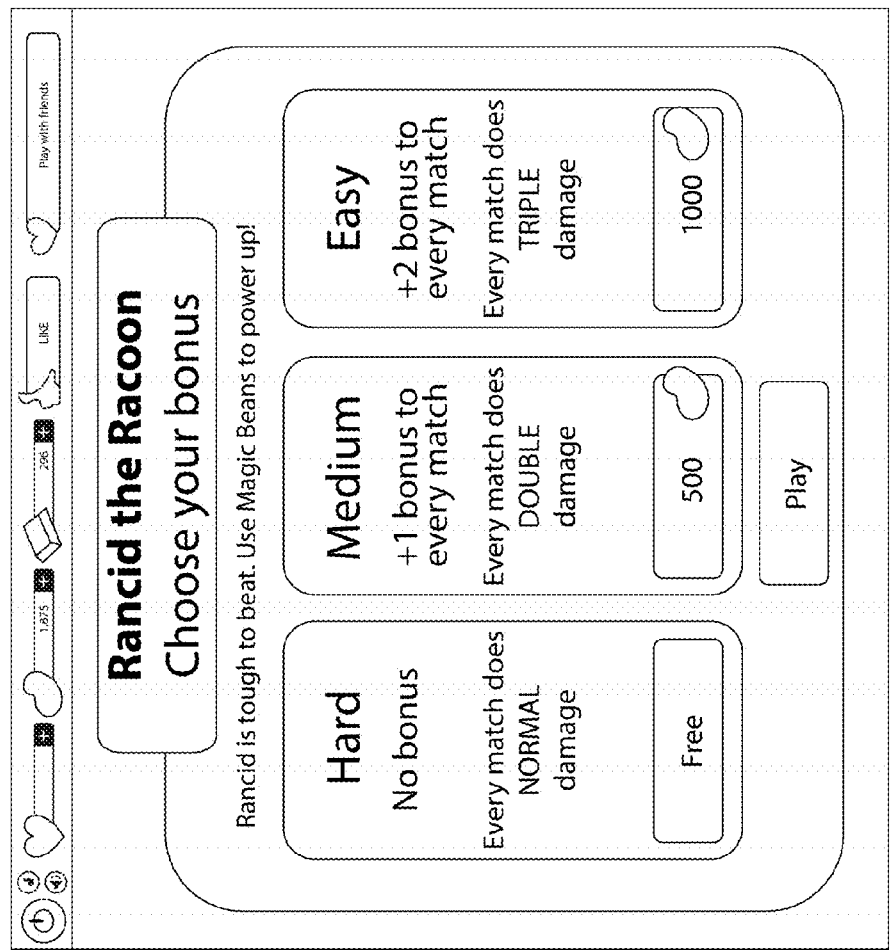
FIG. 10 shows a boss level option screen.

Before the level starts, the player is presented with the option to pay to make more damage to the boss and thus have a higher likelihood of completing the level. In one implementation the options given may be as shown in FIG. 10, where the player can choose to play the level for free, to pay to give +1 in damage for each game element or +2 for each collected game element. These power-ups increase the number of objects that the player collects every time he makes a match, making it easier to pass the level. The currency used to pay with can be in in-game currency or real money where the player then can pay with for instance a credit card. In another implementation the player may also pay to give double or triple damage, also illustrated in FIG. 10.

In some implementations the currency used to buy extra damage for a boss level is received from good gameplay in other levels. In the present implementation this currency is in the form of 'beans', which the player receives based on the score received in one level. The player may also top up with more 'beans', paying for it with real world money or using a virtual currency.

Game Elements ('Cropsies')

These are the game elements on the game board itself, a collection of strawberries, carrots, onions, suns, water drops, and apples. The game elements may be matched in groups of three or more.

Collectable Objects

Egg

Eggs live on the game board much like normal game elements, but they're harder to crack. Once they are cracked, however, a small chick flies out, ready to be collected. When eggs are on the board, one of the collection targets may be chicks. When the players match three eggs, they don't all disappear. Instead, one of the eggs remains and becomes cracked.

Once three cracked eggs are matched, they all zoom together and are destroyed, then a chick flies out and is collected. Eggs need to have two states: whole and cracked. The hatching animation is of a chick emerging from broken shell. Then; the chick flying towards the resource collection area.

Matching 4, 5 or T/L shapes doesn't change what happens to the eggs: They still form together to make a single cracked egg. Combo matches do, however, act identically to normal game elements when it comes to the rest of the effects: Matching 4 will still add +2 to every other required game element adjacent to the matched eggs. Matching T/L will still cause +1's along a row and a column. Matching 5 will still cause +2's to be sent out to 5 random game elements. Unlike normal game elements; eggs don't glow white when these combos occur.

Grower

This is a static object that must have matches made around it to grow. Once it's fully grown, it becomes a collected object.

The grower object acts as a static blocker: not affected by gravity etc. When the players make a match that's adjacent to the grower, it grows one stage. After making X matches (where X is either a pre-set number of defined in the editor), the grower is considered 'grown'. At this point it is removed from the game board, and the grown object flies towards the left-hand resource collection area, where there are: Static idle frames in various states of growth, growing animations and the 'grown' animation: The grown object itself flies towards the resource collection area, while the parts remaining on the game board should dissolve/fade away.

Fount

A fount is a single square on the game board that houses a collection of one game element types.

Unleashing this fount causes those game elements to scatter across the board. This will most often be the only way to get that type of game element. The fount object acts as a static blocker: not affected by gravity etc. When the players make a match that is adjacent to the fount, it loses a 'life'. After three adjacent matches have been made, 6 lots of water burst outwards and land on random squares on the game board (replacing current normal game elements).

Water must not burst out in such a way that makes an automatic match. To try: Fount instantly regenerates itself to full lives once it's been burst.

A static object on the board needs to show a type of game element that is lying underneath. It could be a bubble-like object—it needs to give the impression that it's about to burst, in any case. Idle animation should have the game elements moving around inside, like they're trying to get out. For this there may be a 'Burst' animation.

Blockers

Blocker: Flowers

Flowers are both a blocker and a new collectable object.

They work in the following way: They are static on the board; other objects fall around them. If the players make a match adjacent to the flower, it will grow one stage. After the flower has grown three stages, it leaves the game board and flies to the collection area on the left of the screen.

Blocker: Eggs

Like flowers, eggs are also both a blocker and a different object to collect:

Eggs can be moved and matched just like a regular object. However, once matched, they form together into one cracked egg. The players must then match three cracked eggs to create one chick, which leaves the game board and flies to the collection area. Cracked and non-cracked eggs cannot be matched together Blocker: Ice Ice acts just the same as the cages in Candy Crush do: they are static blockers on the game board with an object inside. That object must be matched with others of the same type to be released.

Blocker: Bubbles

Bubbles store up a certain number of one object types inside of them. If the players make an adjacent match next to a bubble, it pops. When it pops, a certain number of one object types, say, apples, fly out and land on the game board. These objects can then be matched as normal, and the bubble disappears.

Blocker: Pollution Cloud

Static blocked space—not susceptible to gravity; objects fall around it. Adjacent matches make it disappear. It is a squarish shape with rounded corners. It has a dark cloud of pollution—possibly with angry face. It pulses/writhes/bubbles when idle. It expands quickly and dissolves into tiny clouds that evaporate: If it has a face, it should look shocked.

Blocker: Ice

This is a static space—not susceptible to gravity; objects fall around it. It houses a random game element inside. The player can involve that game element in a match to destroy the ice and the game element. They are square blocks of semi-transparent ice. A frozen game element has a shocked look on its face. This shatters and fades away when matched.

Blocker: Grass

Grass acts similarly to jelly in Candy Crush (eg. the players can move objects around on top of them). The major difference is that they're actually a collection target and it's possible to collect more than the players actually need.

In some ways like a reverse jelly, the players must grow grass on certain tiles in order to achieve a collection target. In a grass level, certain tiles of the game board have patches of bare earth on them. One or more of these patches is a tile of already-grown grass. Game elements move freely on top of these two tile types. When a match is made adjacent to the grass, that grass grows into the tiles of the match the players just made. So, if the player makes a vertical match of three game elements to the right of some grass, then those three tiles would also turn into grass. They would need a certain amount of grass tiles to achieve the collection target. There could be more patches of earth than is needed to allow the players to over-achieve.

Other blockers may be implemented in the game to create a more challenging game play and interesting experience for the players.

The game may be implemented with different game field shapes and there may be various constraints implemented into the game board. Such constraints may, for instance, be 'Muddy objects' which cannot be switched, but a match next to will uncover them and reveal, for instance a regular game element.

Another blocker element is the 'crow' element. These game elements need to be matched and collected in a certain number of moves or they will reset the specific collectible counter.

Another blocker element is the 'mole' element. These game elements dig around and cause objects to become muddy and un-switchable. Switch next to the mole to knock it out for a number of rounds, for instance 5 rounds.

Another blocker element is the 'hail storm' element. The hails cause collectible objects to be valued at −1 for the next move.

Boosters

There is a plurality of boosters in the game that are unlocked as the players play and unlock further levels. Please note that this list isn't final and may change in the coming weeks—we'll make sure this info is kept up to date.

The boosters in the game may be implemented with a time mechanic. When the players activate a booster, it becomes inactive for a particular period of time. When that time is finished, the booster can be used again. The earliest booster might take 20 minutes to recharge, while the most powerful might take 72 hours.

The player can also click on a booster that's not yet ready, and pay some currency to hurry it up. Boosters may be bought both pre-level and during the game.

Shovel. Destroys a selected element

Tractor. Click on the booster then click on any row; all objects on that row are destroyed, and all required objects are added to the player's total +1 Giver. All required objects are given a +1 bonus Colour Collect. Click on the booster, then click on any object; Hunter the dog will come and collect all objects of that type Monetisation With regards to the collection mechanic, there is a separate source of revenue coming from this. Players may in some implementations be able to straight up buy collectables that they haven't gathered through game play, as per collections in other games, but once again, new to switchers.

Further Implementations

Oil Slick sits underneath objects. Not susceptible to gravity. Match on top of oil to get rid of it. Any game element on top of oil gets a −1 anti-bonus. As soon as a game element moves out of the oil, it loses the −1. Its appearance is a squarish patch of dark, bubbly oil. Any game element on top of oil looks sad and sick. Disappearing animation: dissolves into the ground when a match is made on top of it Bad Game elements. Evil game elements drop onto the game board and must be avoided! There are six evil versions of the six basic game elements: one for each colour. They act and get matched just the same as normal game elements. Good suns match with bad suns, and so on. The difference: these evil game elements carry a permanent −1. Alternative implementation may be that instead of −1, the Bad Game elements could simply nullify any match made that they're involved in. So if the players need strawberries, but make a match that involves a Bad Strawberry, then none of the strawberries in that match count towards the player's total.

Frequency rules: Bad Game elements should be less frequent than normal game elements, which means we would need to implement some kind of probability setting for when they appear. Alternatively; in the editor, adding Bad Game elements is done with a single tick box. The game then treats them as a single game element type when it comes to generating them. Thus if I had five out of six game elements selected in the editor, as well as the Bad Game elements, that would count as six types in total. The game would then recognise which game elements were required collection targets, and only generate Bad versions of those game elements.

Travelling Pollution Cloud

A nasty, though small, cloud of pollution that moves around the board every turn, making game elements sick. The cloud sits behind game elements, which can travel freely over it. At the start of every turn, once the game board is idle, it makes all game elements sitting on top get a −1. When the players make a match, it temporarily disappears/becomes inactive. When the board is idle once more, it reappears in a random place on the board and gives game elements on top of it a −1. This could be the size of a single tile, or that of four tiles.

Gopher/Mole

A mischievous animal who likes to grab game elements and pull them underground. At the start of every turn, when the game board is idle, the gopher pops up on a random tile and consumes the game element there. He then sits on that tile. After the players make a match, he disappears underground for a turn, leaving behind an empty space that game elements will then fill. After another match is made, the mole pops up again and repeats this process. If the players make a match adjacent to the gopher, while he is above ground, he is stunned for three turns.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API, which allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game
Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, have a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new tides.

Virtual Map

Figure 12:
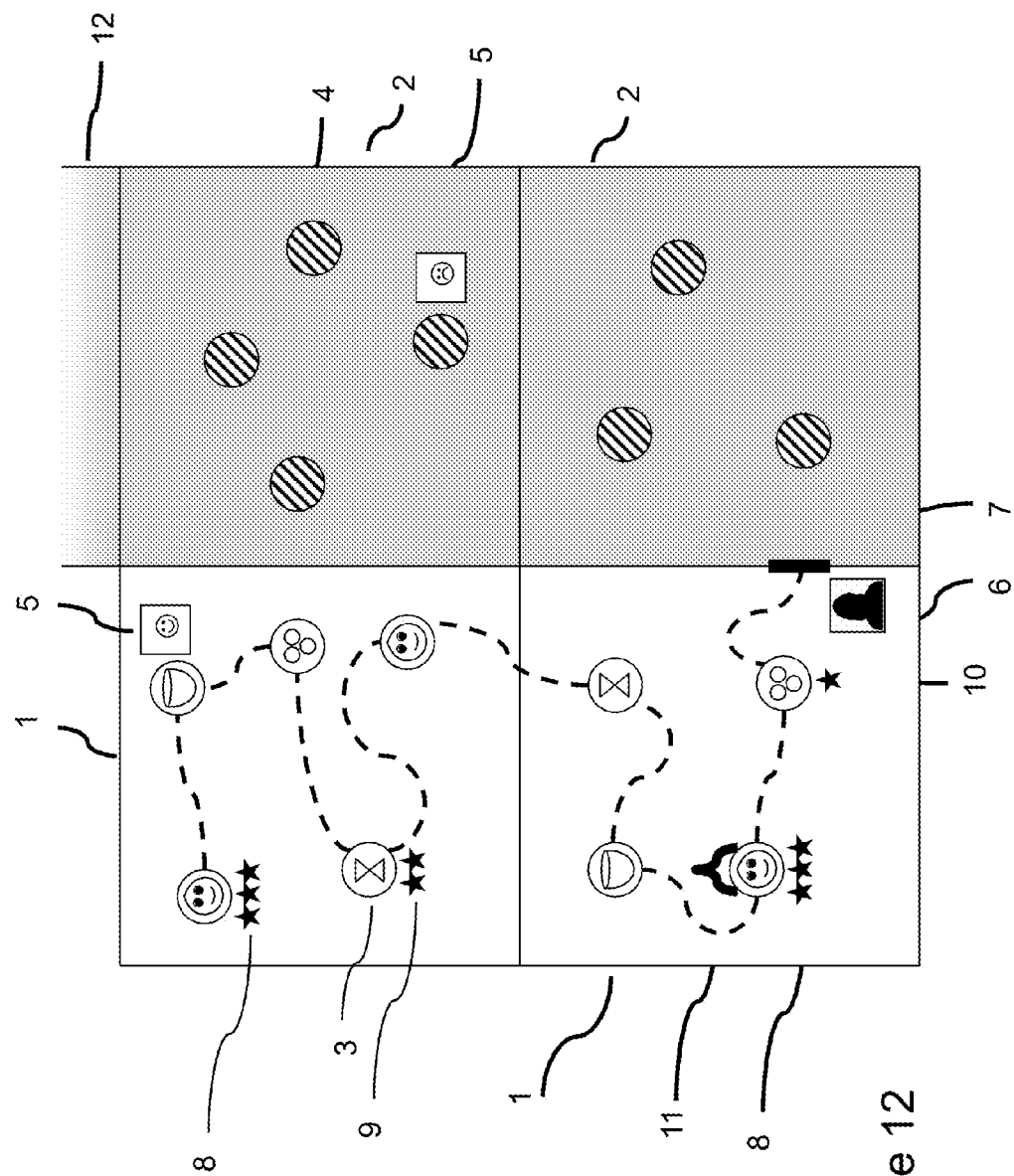
FIG. 12 shows an implementation of a virtual map.

The game can be implemented so that a player progresses through multiple levels of changing and typically increasing difficulty. FIG. 12 shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friends and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through the use of 'Mystery Quests', which gives the player the option of completing one or several challenges to unlock the block. Such challenges can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to which the game is connected. This is one of the viralisation techniques implemented in this game.

In addition to the virtual map layout in FIG. 12, there can also be other levels or stages that are not part of the progress along the path in the virtual map. Such stages or levels can be present in the game associated with the virtual map at all times, or can be unlocked once the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 12 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people who are not friends on the social network, but that meet other certain criteria.

The user can play any of the unlocked levels on the map, so the user can go back and replay already completed levels to get a better score or beat friends' high scores.

In some implementations of the game the player is rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

In the map view, the player can hover over an unlocked level to display a thumbnail version of it. This makes it easier to find specific completed levels, and can also give the player an idea of what to expect before actually starting a level. In a typical implementation, thumbnails cannot be displayed for levels that have not yet been unlocked. If trying to view one of these a symbol of a padlock will be in the place where the miniature version of the level is supposed to be.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance, be in the form of an object related to the game goal, such as an hourglass representing a level with a time constraint.

Animations and Interactions on the Virtual Map

The landscape of the virtual map will typically have animated sequences, which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 13:
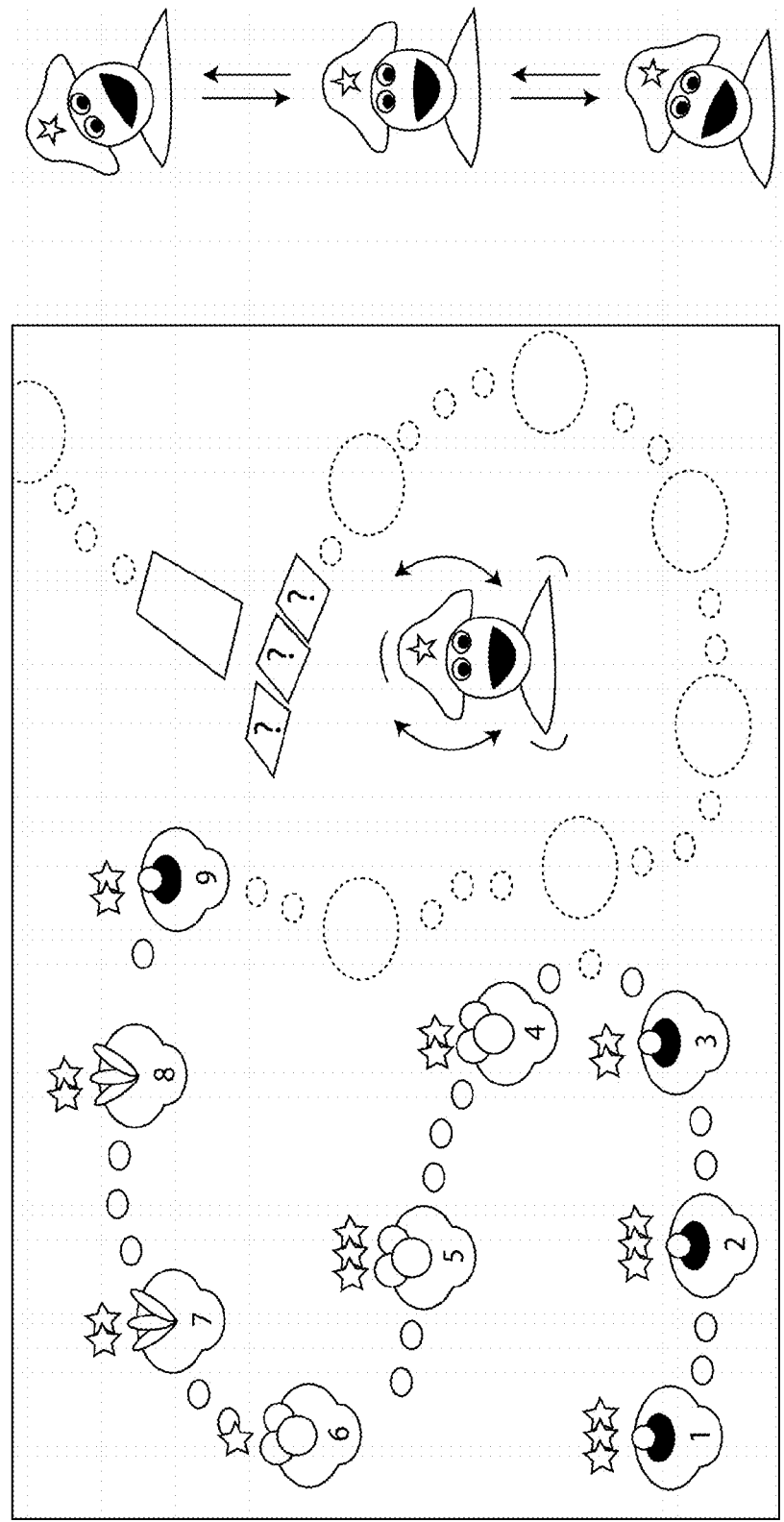
FIG. 13 shows an animated sequence on a virtual map.

One example of how the virtual map can be dynamic and moving is shown in FIG. 13 where as an example, a coconut character moves slightly from side to side. A collection of subtle as well as less subtle animations throughout the map will together make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 14:
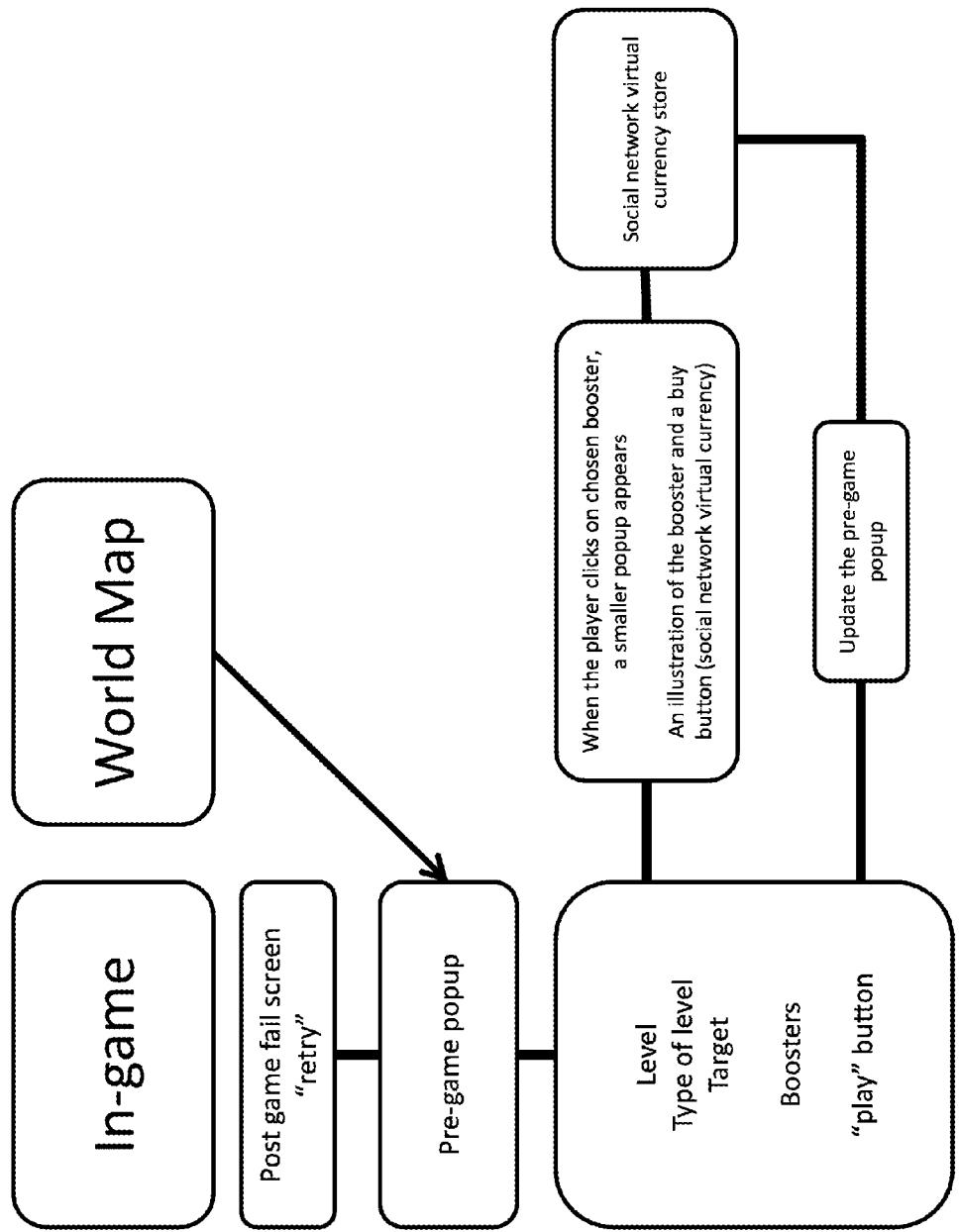
FIG. 14 shows a pre-level game progression.

FIG. 14 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 15:
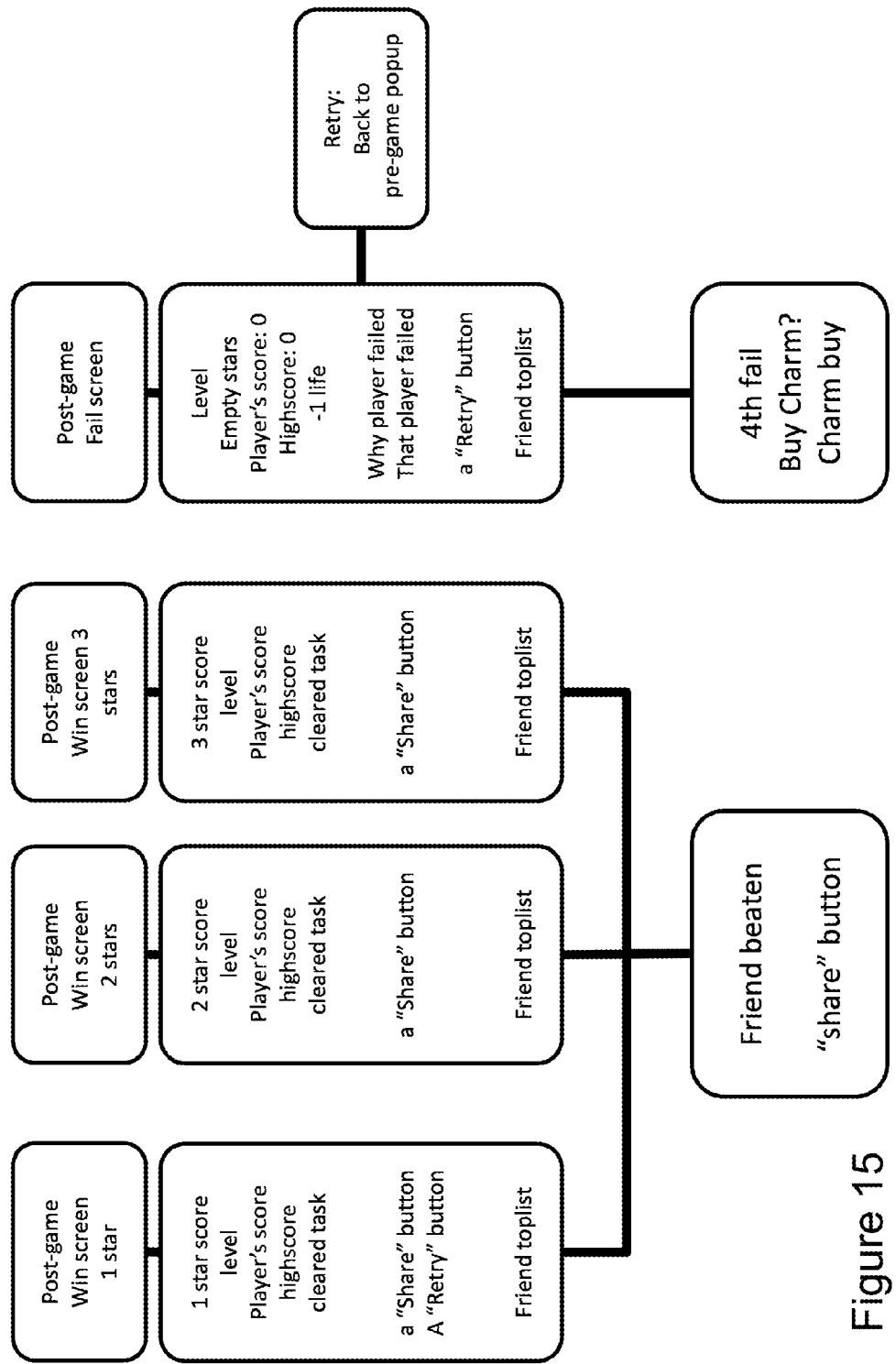
FIG. 15 shows a post-level game progression.

After completing a level, the player is presented with a screen that shows the amount of points gained, the amount of stars achieved and also the previous highscores of friends. One implementation of the game flow related to the post-level screen is shown in FIG. 15.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 16:
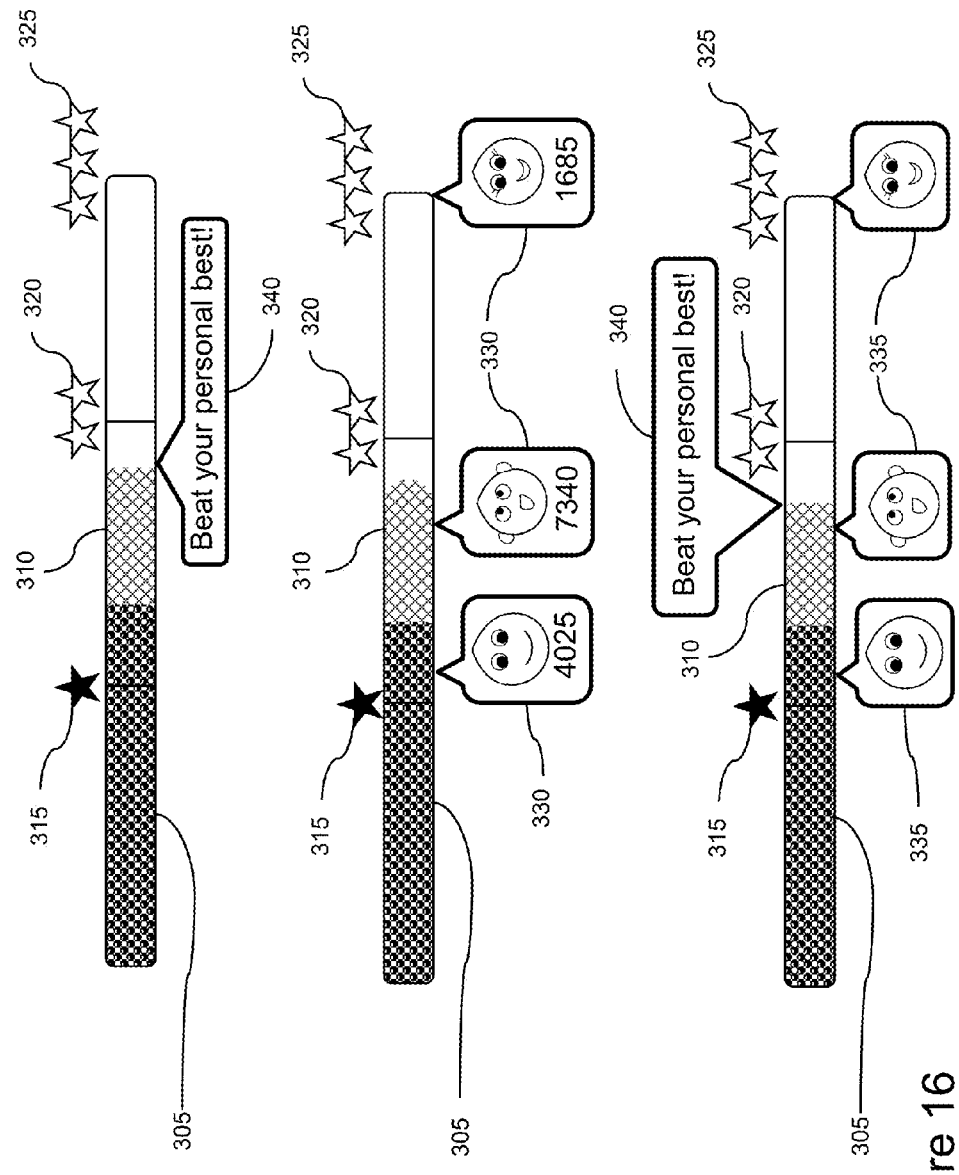
FIG. 16 shows different ways of implementing a score meter and the results of other players.

In some implementations, the player can see indications of the previous high score achieved on a level while playing it, shown by 310 in FIG. 16. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 16. When the player passes the score of another player or the previous best score the player has achieved, a message can be shown to encourage the player and denote the accomplishment. One example of such a message is illustrated by 340 in FIG. 16.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on whether the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Sending Gifts

One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 17:
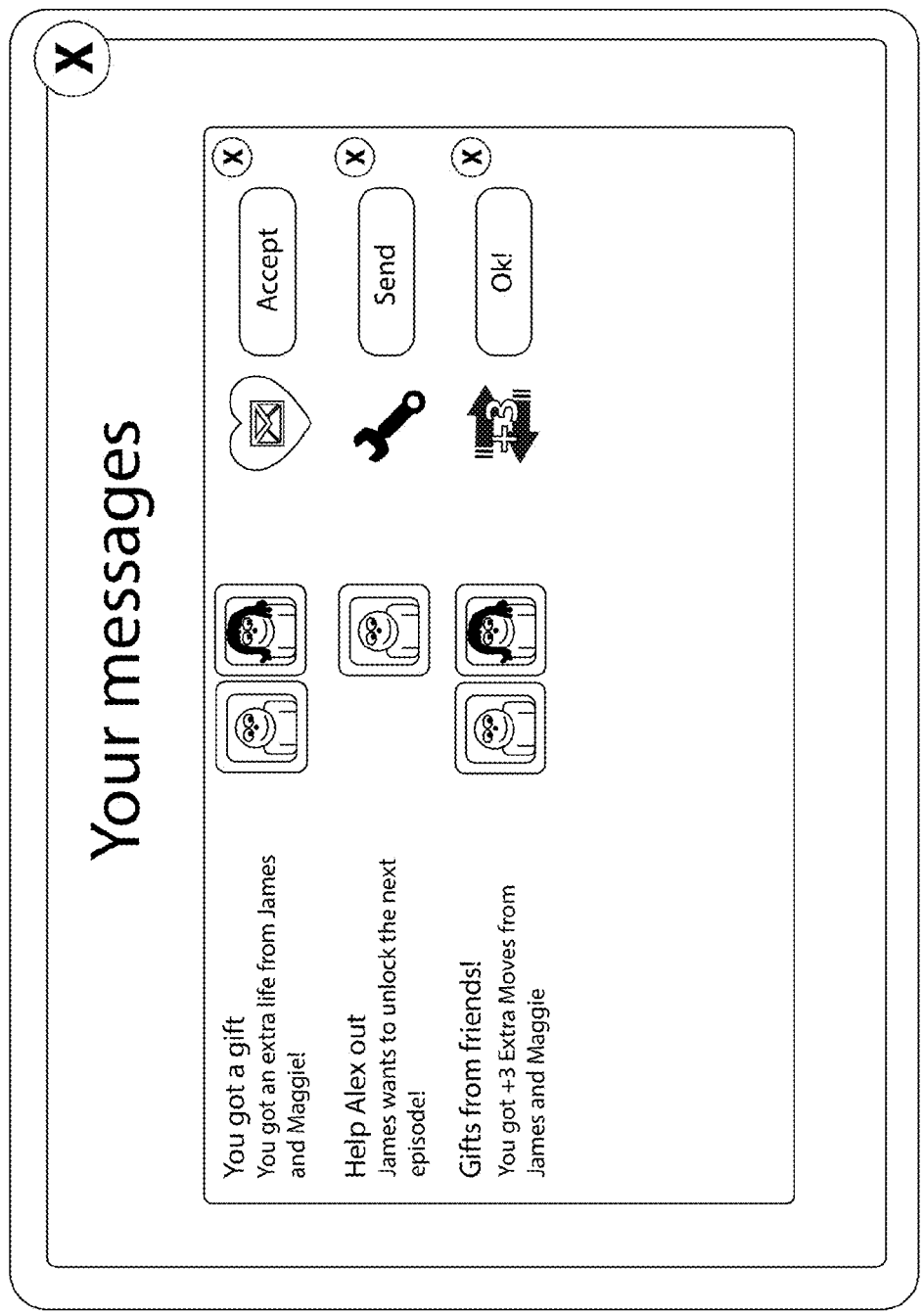
FIG. 17 shows an implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 17 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 18:
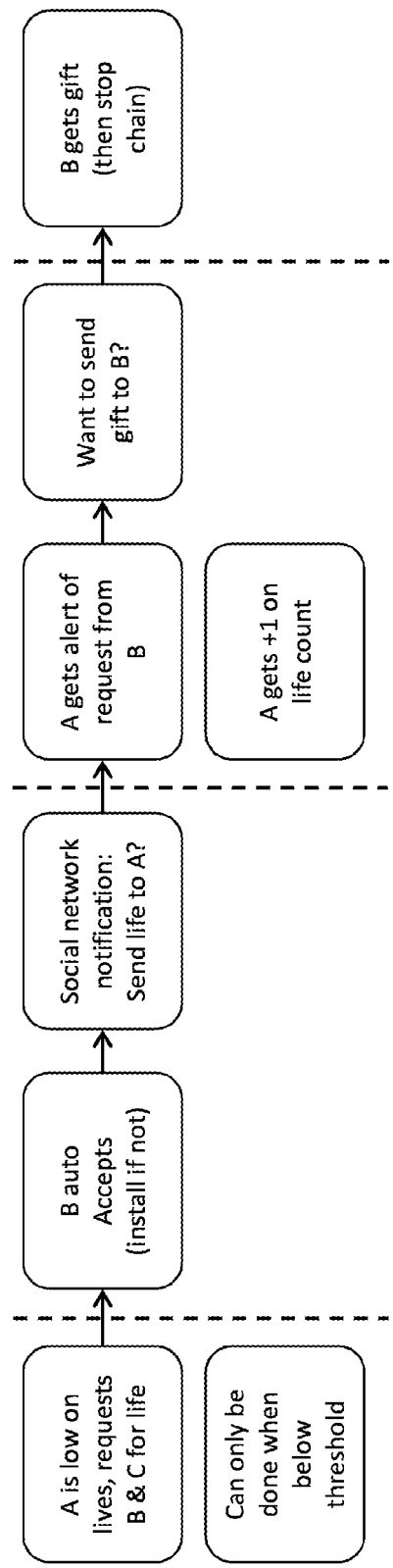
FIG. 18 shows an implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 18.

It is also possible to buy gifts in the in-game shop and send these to friends. Such gifts are in the form of boosters that can be used either during a level or before a level.

Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck, is related to the amount of times they have tried and failed a level.

Figure 19:
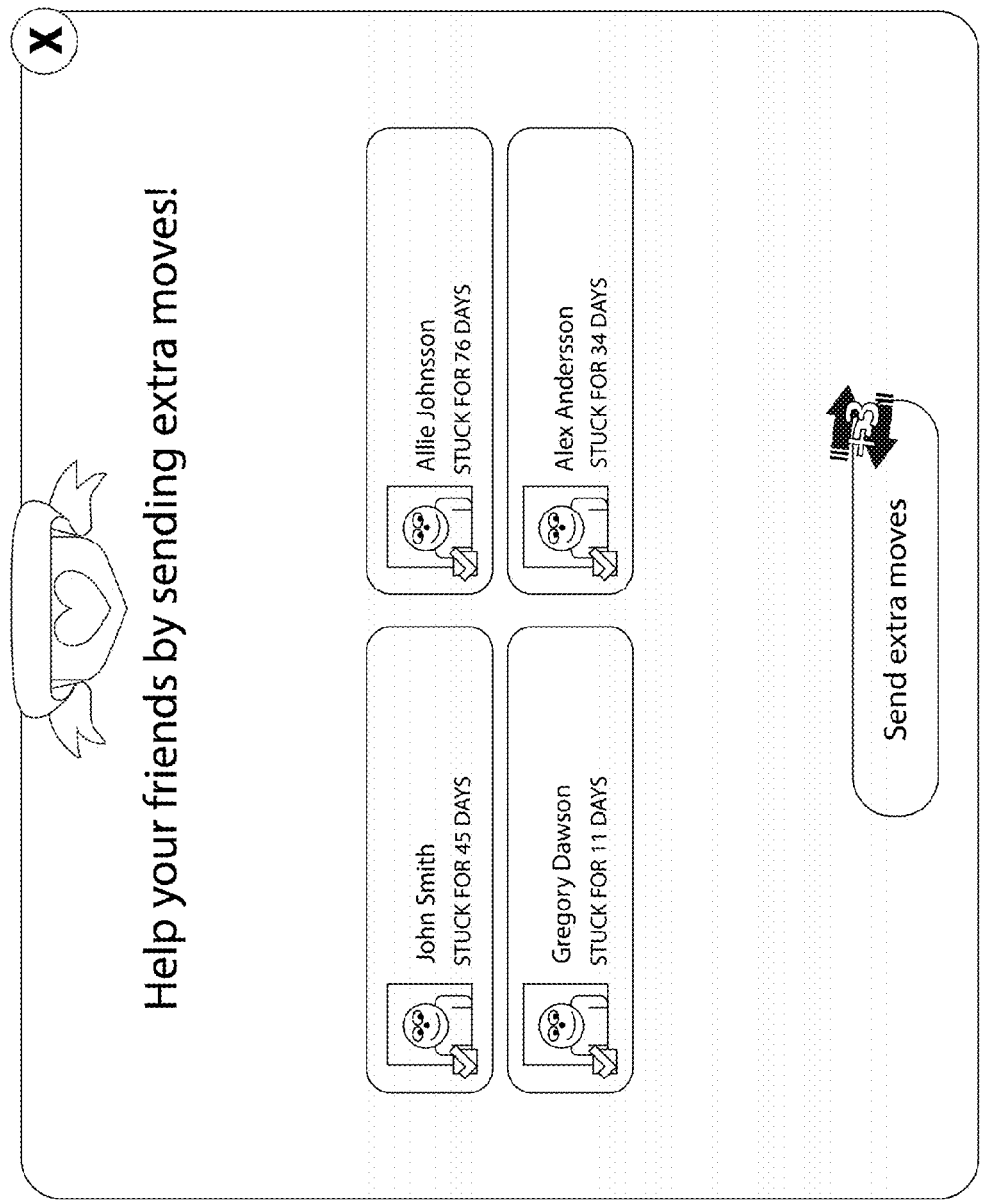
FIG. 19 shows an example of a screen to help friends.

The prompting from the game can happen at different points in the game, for instance when a player logs onto the game. Such prompting is illustrated in FIG. 19. The prompting increases engagement by increasing the likelihood of someone providing help to players when the game is particularly difficult, it also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives. See FIG. 19.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots, where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and in-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Three platforms in particular are changing the way people expect games to be played. These three platforms are growing at the same time, and provide new input possibilities. To date, games have not absorbed all the new input possibilities.

The first platform is Facebook. The skilled person will understand that where Facebook is referred to in this document, other social network platforms may be used. A Facebook game may be a social game, a game you play with your friends. It is rare or unthinkable to launch a game (i.e. to play for the first time) on Facebook that is a paid game, because people playing games on Facebook expect not to pay to access a game. A Facebook game may be played on the internet, after logging in to Facebook (whether automatically or manually), such as from a personal computer.

The second platform is smartphones. Use of smartphones is not always continuous. You may use a smartphone for 5 minutes on a bus, and then for 20 minutes on a connecting train, for example. The use can have many starts and stops. Not like someone working at an office desk or at a home desk in a conventional way. A smartphone can be on an iOS platform, or on an Android platform, for example.

The third platform is tablets. What is a tablet? It can function as a mobile device and as a non-mobile device. The tablet can be a substitute for a personal computer. A user may want a seamless experience between using the game on a personal computer and on a tablet and on another mobile device. A tablet can be on an iOS platform, or on an Android platform, for example.

A game which works on a plurality of such as all three of the above platforms (or more), may provide a connected fully-synchronized seamless experience. Hence multi-platform games are important. Key criteria for multi-platform games are: they are free, they are social, stop-start use is possible, and seamless experience is provided. Such games may be "played anywhere" e.g. in a mobile environment or in a non-mobile environment. Such games may also be played online or offline.

The game must be fun when used in a stop-start way, and when used for even just short intervals. In an example, a game consists of parts or levels, each of which runs for about 3 minutes, eg. between 1 and 5 minutes. In an example, a game is structured in levels, so that if successful in a game level, such as by scoring a minimum score, a user can progress from that level to the next level. In an example, a game has about 200 levels.

A game can be optimized post-launch. For example, if it is clear that too many users are failing to progress past a particular level, the minimum score to pass the level can be lowered. An optimized game may be provided as an application update from an application store. In an alternative, a game may be optimized by a server sending a revised data file of scores required to pass each game level to a mobile device, when a game state of a user is being synchronized with the server, wherein the application running on the device replaces the previous file of scores stored on the device required to pass each level with the revised file of scores required to pass each level.

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that are active on a computer-based platform could get a bonus for also installing the game on a handheld device. Such bonuses may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one and other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One Example of an Implementation with Synchronisation Across Platforms is as Follows:

A first server, for instance one hosting a social network, with a first data store, storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not to interfere with for instance the times of the day that players are as most active.

If trying to access the game online, as opposed to starting a local version that is saved on the device, while updates are being made, the player can be met by a message saying that the game cannot be accessed at that moment.

The invention claimed is:

1. A computer-implemented method of controlling a display responsive to user engagement via a user interface with a game board of a computer implemented game displayed on said display, the method comprising the following implemented by at least one processor of a computer device in communication with said interface, said display and at least one memory:

displaying the game board on said display, said game board having removable game elements of a first type and of a second type, the first type of removable game elements comprising removable elements of one or more specific collectable game elements, and the second type of removable game elements comprising removable elements of one or more other types detecting a move comprising selection of at least one removable game element with respect to the displayed game board in response to user input received via said user interface;

determining in response to said detected move, an occurrence of at least one match with respect to said removable game elements; and in response to said determining of the occurrence of at least one match:

removing said game elements of said at least one match from said game board displayed on the display;

determining for each removed game element if said removed game element is of the first type or the second type and only for the game elements of the first type updating information associated with a removed number of game elements, wherein removal of said game elements of the second type does not cause said information associated with the removed number of game elements to change; and determining from said information that a defined number of game elements of the first type have been removed within a defined number of moves to thereby pass a level of said game.

2. The method of claim 1 in which said at least one processor is programmed such that a bonus number +X is applied to a game element on the game board and displayed as a bonus number X adjacent to that element, and removing that element is handled by the processor as being equivalent to removing X+1 elements of that type.

3. The method of claim 1 in which said at least one processor is programmed such that, when the user makes a match of elements that leads to elements being removed from the game board, and then any remaining adjacent elements that are also of first type are allocated a bonus number.

4. The method of claim 1 in which said at least one processor is programmed such that removing elements causes new elements to move into position on the game board, creating further matches, then any remaining adjacent elements that are also of the first type are allocated a bonus number.

5. The method of claim 1 in which said at least one processor is programmed such that a bonus number +X is applied to every collectable game element on the game board within a defined region.

6. The method of claim 1 in which said at least one processor is programmed such that if the user removes more than the defined number of game elements of all of the first type, then the processor causes the game to enter a new mode in which some of the game elements on the board are automatically allocated a bonus number.

7. The method of claim 1 in which said at least one processor is programmed such that the extent to which the user removes more than the defined number of game elements is counted and a number of bonus items, such as green beans, is allocated to the user depending on this extent.

8. The method of claim 1 in which said at least one processor is programmed such that the number of bonus items is relevant to another level in which the objective is to remove a defined number of game elements of several specific types of the first type in order to defeat a character and the bonus items can be used to purchase a bonus number to be applied automatically to one or more game elements or to a matched combination of game elements in order to make the level easier.

9. The method of claim 1 in which said at least one processor is programmed such that the defined number of game elements of several specific types of the first type is displayed on screen.

10. The method of claim 1 in which said at least one processor is programmed such that the number of a specific single type of collectable element is relevant to completing a level and is displayed to the user.

11. The method of claim 1 in which a processor is programmed such that the defined number of game elements of several specific collectable types is not displayed on screen.

12. The method of claim 1 in which said at least one processor is programmed such that the number of a specific single type of collectable element is not relevant to completing a level, but instead the total number of all collectable types is relevant.

13. The method of claim 1 in which said at least one processor is programmed such that the game board includes a type of collectable element that cannot be removed by being included in a match.

14. The method of claim 1 in which said at least one processor is programmed such that the game board includes special blocking elements that can only be removed after there have been multiple matches to remove adjacent elements.

15. The method of claim 1 in which the special elements are shown as items whose appearance changes after each match of adjacent elements, and (a) sound effect accompanies the change of appearance, (b) the special element is a flower that progressively opens after each match of adjacent elements and (c) a goal of the level is to remove a set number of these special elements.

16. The method of claim 1 in which said at least one processor is programmed such that the elements include one or more of the following, each with animated faces: vegetables, animals, candies, sun, moon, flowers.

17. The method of claim 1 in which said at least one processor is programmed such that a collectable element evolves in stages each time it is included in a matching combination.

18. The method of claim 17 in which the collectable element is an egg and a combination of three eggs creates a cracked egg, and a combination of three cracked eggs creates an animal that flies off the game board; and one of the goals for a level is to collect one or more of these animals.

19. The method of claim 1 in which said at least one processor is programmed such that an element on the game board is a bucket that progressively fills with water each time there is a match of elements adjacent to it and that element can spill over after a set number of matches adjacent to it, causing collectable elements to be shown on the game board.

20. The method of claim 1 in which said at least one processor is programmed such that reaching targets for a level earns a user stars, and earning 1 star earns the user an animal of one species, earning two stars earns the user a different species and earning three stars earns the user a still different species.

21. The method of claim 1 in which said at least one processor is programmed such that, if the user earns a collection of one group of different species, then that collection entitles the user to one type of booster; and if the user earns a collection of a different group of species, then that collection entitles the user to a different type of booster.

22. The method of claim 1 in which some or all game levels are untimed, eliminating any time pressure.

23. The method of claim 1 in which the game is a casual, social game and some or all levels have a true fail, to enable monetization through purchasing extra moves.

24. The method of claim 1 in which there is a continuous musical soundtrack plays during gameplay.

25. The method of claim 1 in which the method generates and displays congratulatory messages when the scores more than a predefined amount, or matches more than a predefined number of game elements, in a single move.

26. The method of claim 1 in which there is an algorithm for automatically detecting when there are no possible moves left.

27. The method of claim 1 in which there is an algorithm for re-shuffling the elements on the game board.

28. The method of claim 1 in which said at least one processor generates, if no move has been made for a while, help or hints by brightening and enlarging game elements used in a possible move on the board with a flashing animation.

29. The method of claim 1 in which said at least one processor is programmed to require a user to reach a target score before running out of moves in order to complete a level successfully, but completing the level is not timed.

30. The method of claim 1 in which said at least one processor is programmed to automatically replenish a life for a user in 30 minutes.

31. The method of claim 1 in which said at least one processor is programmed so that, if a user finishes a level in under the target number of moves, then random game elements on the game board are triggered and give the user bonus points.

32. The method of claim 1 in which said at least one processor is programmed so that, if a level is finished with moves left, those moves are converted to special game elements that trigger for extra bonus points.

33. The method of claim 1 in which said at least one processor is programmed so that the game generates and displays congratulatory messages when the user scores more than a predefined amount, or matches more than a predefined number of game elements, in a single move.

34. The method of claim 1 in which said at least one processor is programmed so that the user can ask his friends for lives.

35. The method of claim 1 in which said at least one processor is programmed so that the user can ask his friends for other help.

36. The method of claim 1 in which social network friends are prompted to assist another user if that other user has played, but not completed, a level meeting a certain criteria.

37. The method of claim 1 in which said at least one processor is programmed so that the user can send gifts to friends.

38. The method of claim 1 in which said at least one processor is programmed so that the game can be synchronized between different devices.

39. The method of claim 1 in which s-said at least one processor is programmed so that a user can seamlessly stop and re-start playing the game at any time since game state information is stored.

40. The method of claim 1 in which every change in a game state is accompanied by sound and visual feedback to provide immediate, positive gratification to the user.

41. The method of claim 1 in which game state information is preserved, enabling a remote server system to identify a user and all aspects of the state of the game they are playing, so that the user can end game play on one device and resume from a different device at a later time at exactly the same state.

42. The method of claim 41 in which the different device can be a different type of device, so that the user can move seamlessly between playing the game on a smartphone and on a tablet.

43. The method of claim 1 in which a remote server system can identify a user because that user has accessed the game through a social network.

44. The method of claim 1 in which the game is a casual, social game, namely a game that can be downloaded as an app to a smartphone and/or tablet computer and which can be accessed or played using a social network application or environment.

45. The method of claim 1 in which said at least one processor is programmed to show a virtual path or other virtual world that indicates the level reached by the user and that user's social network friends.

46. The method of claim 1 in which the design of the game is optimised through a process including the step of: using data analytics to understand the impact of changes to the game design in terms of user engagement or monetization or viralisation and; implementing changes to the game design, including frequent changes to optimise user engagement or monetisation or viralisation.

47. A computing device adapted to control a display responsive to user engagement via a user interface, with a game board of a computer implemented game displayed on said display, the method comprising the following implemented by at least one processor of a computer device in communication with said interface, said display and at least one memory:

display the game board on said display, said game board having removable game elements of a first type and of a second type, the first type of removable game elements comprising removable elements of one or more specific collectable game elements, and the second type of removable elements comprising removable elements of one or more other types;

detect a move comprising selection of at least one removable game element with respect to the displayed game board in response to user input received via said user interface;

determine in response to said detected move, an occurrence of at least one match with respect to said removable game elements; and in response to said determining of the occurrence of at least one match:

remove said game elements of said at least one match from said game board displayed on the display;

determine for each removed game element if said removed game element is of the first type or the second type and only for the game elements of the first type updating information associated with a removed number of game elements, wherein removal of said game elements of the second type does not cause said information associated with the removed number of game elements to change; and determine from said information that a defined number of game elements of the first type have been removed within a defined number of moves to thereby pass a level of said game.

48. A non-transitory computer readable medium encoded with instructions for controlling a computer system to control a display responsive to user engagement via a user interface, with a game board of a computer implemented game displayed on said display, the method comprising the following implemented by at least one processor of a computer device in communication with said interface, said display and at least one memory:

display the game board on said display, said game board having removable game elements of a first type and of a second type, the first type of removable game elements comprising removable elements of one or more specific collectable game elements, and the second type of removable elements comprising removable elements of one or more other types;

detect a move comprising selection of at least one removable game element with respect to the displayed game board in response to user input received via said user interface;

determine in response to said detected move, an occurrence of at least one match with respect to said removable game elements; and in response to said determining of the occurrence of at least one match:

remove said game elements of said at least one match from said game board displayed on the display;

determine for each removed game element if said removed game element is of the first type or the second type and only for the game elements of the first type updating information associated with a removed number of game elements, wherein removal of said game elements of the second type does not cause said information associated with the removed number of game elements to change; and determine from said information that a defined number of game elements of the first type have been removed within a defined number of moves to thereby pass a level of said game.

\* \* \* \* \*